(12) United States Patent
Rappaport et al.

(10) Patent No.: US 7,596,518 B2
(45) Date of Patent: Sep. 29, 2009

(54) METHOD AND SYSTEM FOR GENERATING A REAL TIME BILL OF MATERIALS AND EVALUATING NETWORK PERFORMANCE

(75) Inventors: Theodore S Rappaport, Blacksburg, VA (US); Roger R. Skidmore, Blacksburg, VA (US)

(73) Assignee: Wireless Valley Communications, Inc., Austin, TX (US)

( * ) Notice: Subject to any disclaimer, the term of this patent is extended or adjusted under 35 U.S.C. 154(b) by 1530 days.

(21) Appl. No.: 10/266,711

(22) Filed: Oct. 9, 2002

(65) Prior Publication Data

US 2003/0050878 A1 Mar. 13, 2003

Related U.S. Application Data

(63) Continuation of application No. 09/318,842, filed on May 26, 1999, now Pat. No. 6,493,679.

(51) Int. Cl.
*G06Q 30/00* (2006.01)
(52) U.S. Cl. ............................ 705/29; 455/403; 455/422
(58) Field of Classification Search ................. 705/29; 455/403, 422
See application file for complete search history.

(56) References Cited

U.S. PATENT DOCUMENTS

| | | | |
|---|---|---|---|
| 4,675,147 A | 6/1987 | Schaefer et al. |
| 4,736,453 A | 4/1988 | Schloemer |
| 4,885,694 A | 12/1989 | Pray et al. |
| 5,111,392 A | 5/1992 | Malin |
| 5,119,307 A | 6/1992 | Blaha et al. |
| 5,239,487 A | 8/1993 | Horejsi et al. |

(Continued)

FOREIGN PATENT DOCUMENTS

WO  WO 0013115  3/2000

(Continued)

OTHER PUBLICATIONS

From Bird's Eye-Real-time Mapping Software dated Jun. 30, 2002.

(Continued)

*Primary Examiner*—Nga B. Nguyen

(57) ABSTRACT

An automated method for quickly generating a complete bill of materials and total cost information in real time. Components for a desired system are specified and/or replaced by substitute components, while continuously predicting the wireless system performance. A design engineer builds a model of the desired wireless communications system and specifies each component necessary to provide sufficient or optimal system performance. A parts list is maintained, in real time, that contains a definition of each system component and its associated performance and cost parameters. As the user changes wireless system designs through a series of "what-if" scenarios, components are replaced with substitute components, cable lengths are modified, antenna systems and base station parameters are re-designed and moved to alternate locations, etc. The bill of materials is automatically updated and component costs and total system costs are immediately available to the design engineer. The designer may choose to swap components for less expensive components or may investigate several alternate radio frequency distribution and antenna schemes, etc. The performance characteristics of the system are automatically updated as is the system cost as the designer to assesses the trade-offs between performance and cost at the same time.

20 Claims, 20 Drawing Sheets

U.S. PATENT DOCUMENTS

| | | |
|---|---|---|
| 5,293,640 A | 3/1994 | Gunmar et al. |
| 5,307,261 A | 4/1994 | Maki et al. |
| 5,337,149 A | 8/1994 | Kozah et al. |
| 5,339,184 A | 8/1994 | Tang |
| 5,375,123 A | 12/1994 | Andersson et al. |
| 5,394,522 A | 2/1995 | Sanchez-Frank et al. |
| 5,450,615 A | 9/1995 | Fortune et al. |
| 5,458,123 A | 10/1995 | Unger |
| 5,465,390 A | 11/1995 | Cohen |
| 5,467,441 A | 11/1995 | Stone et al. |
| 5,482,050 A | 1/1996 | Smokoff et al. |
| 5,485,568 A | 1/1996 | Venable et al. |
| 5,491,644 A | 2/1996 | Pickering et al. |
| 5,491,837 A | 2/1996 | Haartsen |
| 5,493,679 A | 2/1996 | Virgil et al. |
| 5,515,269 A | 5/1996 | Willis et al. |
| 5,528,518 A | 6/1996 | Bradshaw et al. |
| 5,539,665 A | 7/1996 | Lamming et al. |
| 5,553,312 A | 9/1996 | Gattey et al. |
| 5,553,620 A | 9/1996 | Snider et al. |
| 5,555,354 A | 9/1996 | Strasnick et al. |
| 5,561,841 A | 10/1996 | Markus |
| 5,564,070 A | 10/1996 | Want et al. |
| 5,586,254 A | 12/1996 | Kondo et al. |
| 5,594,946 A | 1/1997 | Menich et al. |
| 5,598,532 A | 1/1997 | Liron |
| 5,625,827 A | 4/1997 | Krause et al. |
| 5,636,344 A | 6/1997 | Lewis |
| 5,689,355 A | 11/1997 | Okubo et al. |
| 5,710,758 A | 1/1998 | Soliman et al. |
| 5,755,072 A | 5/1998 | Lingafelter |
| 5,761,093 A | 6/1998 | Urbish et al. |
| 5,774,669 A | 6/1998 | George et al. |
| 5,794,128 A | 8/1998 | Brockel et al. |
| 5,799,154 A | 8/1998 | Kuriyan |
| 5,802,146 A | 9/1998 | Dulman |
| 5,809,282 A | 9/1998 | Cooper et al. |
| 5,815,395 A | 9/1998 | Hart et al. |
| 5,821,937 A | 10/1998 | Tonelli et al. |
| 5,825,759 A | 10/1998 | Liu |
| 5,828,960 A | 10/1998 | Tang et al. |
| 5,831,610 A | 11/1998 | Tonelli et al. |
| 5,832,389 A | 11/1998 | Dent |
| 5,845,124 A | 12/1998 | Berman |
| 5,861,887 A | 1/1999 | Butler et al. |
| 5,867,112 A | 2/1999 | Kost |
| 5,877,777 A | 3/1999 | Colwell |
| 5,878,328 A | 3/1999 | Chawla et al. |
| 5,907,850 A | 5/1999 | Krause et al. |
| 5,917,808 A | 6/1999 | Kosbab |
| 5,923,850 A | 7/1999 | Barroux |
| 5,926,762 A | 7/1999 | Arpee et al. |
| 5,940,196 A | 8/1999 | Piehler et al. |
| 5,945,976 A | 8/1999 | Iwamura et al. |
| 5,948,055 A | 9/1999 | Pulsipher et al. |
| 5,949,335 A | 9/1999 | Maynard |
| 5,949,988 A | 9/1999 | Feisullin et al. |
| 5,953,669 A | 9/1999 | Stratis et al. |
| 5,963,867 A | 10/1999 | Reynolds et al. |
| 5,970,406 A | 10/1999 | Komara |
| 5,977,851 A | 11/1999 | Stancil et al. |
| 5,987,328 A | 11/1999 | Ephremides et al. |
| 5,994,984 A | 11/1999 | Stancil et al. |
| 6,006,021 A | 12/1999 | Tognazzini |
| 6,018,625 A | 1/2000 | Hayball et al. |
| 6,021,316 A | 2/2000 | Heiska et al. |
| 6,032,105 A | 2/2000 | Lee et al. |
| 6,038,547 A | 3/2000 | Casto |
| 6,044,273 A | 3/2000 | Tekinay |
| 6,058,102 A | 5/2000 | Drysdale et al. |
| 6,058,262 A | 5/2000 | Kawas et al. |
| 6,059,842 A | 5/2000 | Dumarot et al. |
| 6,061,722 A | 5/2000 | Lipa et al. |
| 6,075,541 A | 6/2000 | Maclinovsky |
| 6,085,335 A | 7/2000 | Djoko et al. |
| 6,088,522 A | 7/2000 | Lee et al. |
| 6,104,699 A | 8/2000 | Holender et al. |
| 6,108,309 A | 8/2000 | Cohoe et al. |
| 6,111,857 A | 8/2000 | Soliman et al. |
| 6,122,083 A | 9/2000 | Ohta et al. |
| 6,148,010 A | 11/2000 | Sutton et al. |
| 6,199,032 B1 | 3/2001 | Anderson |
| 6,204,813 B1 | 3/2001 | Wadell et al. |
| 6,208,833 B1 | 3/2001 | Preschutti et al. |
| 6,229,540 B1 | 5/2001 | Tonelli et al. |
| 6,243,772 B1 | 6/2001 | Ghori et al. |
| 6,253,086 B1 | 6/2001 | Parantainen et al. |
| 6,285,377 B1 | 9/2001 | Greenbaum et al. |
| 6,289,203 B1 | 9/2001 | Smith et al. |
| 6,311,144 B1 | 10/2001 | Abu El Ata |
| 6,317,599 B1 | 11/2001 | Rappaport et al. |
| 6,326,987 B2 | 12/2001 | Alexander |
| 6,330,005 B1 | 12/2001 | Tonelli et al. |
| 6,337,688 B1 | 1/2002 | Berstis |
| 6,338,031 B1 | 1/2002 | Lee et al. |
| 6,356,758 B1 | 3/2002 | Almeida et al. |
| 6,393,432 B1 | 5/2002 | Flansburg et al. |
| 6,408,312 B1 | 6/2002 | Forthman et al. |
| 6,442,507 B1 | 8/2002 | Skidmore et al. |
| 6,470,195 B1 | 10/2002 | Meyer |
| 6,487,417 B1 | 11/2002 | Rossoni et al. |
| 6,493,679 B1 | 12/2002 | Rappaport et al. |
| 6,496,290 B1 | 12/2002 | Lee |
| 6,499,006 B1 | 12/2002 | Rappaport et al. |
| 6,505,045 B1 | 1/2003 | Hills et al. |

FOREIGN PATENT DOCUMENTS

| | | |
|---|---|---|
| WO | WO 0073953 | 12/2000 |
| WO | WO 0074401 | 12/2000 |

OTHER PUBLICATIONS

IEEE Transactions on Antennas and propagation, vol. 46, No. 8, Aug. 1998. "Effect oF Terrrain on Path Loss in Urban Enviroments for Wireless Applications" Leonard Piazzi and Henry L. Bertoni.

P. Bahl, V. Padmanabhan, and A. Balachandran, "A Software System for Locating Mobile Users: Design, Evaluation, and Lessons," Microsoft Technical Report, Apr. 2000.

G. Durgin, T.S. Rappaport, H. Xu, Measurements and Models for Radio Path Loss and Penetration Loss in and Around Homes and Trees at 5.85 GHz, IEEE Transactions on Communications, vol. 46, No. 11, Nov. 1998.

C.M. Peter Ho et al., "Antenna Effects on Indoor Obstructed Wireless Channels and a Deterministic Image-Based Wide-Band Propagation Model for In-Building Personal Communications Systems," International Journal of Wireless Information Networks, vol. 1, No. 1, 1994.

S. Kim et al., "Radio Propagation Measurements and Predictions Using Three-dimensional Ray Tracing in Urban Environments at 908 MHZ and 1.9 GHz," IEEE Transactions on Vehicular Technology, vol. 48, No. 3, May 1999.

T.S., Rappaport et al., "Use of Topographic Maps with Building Information to Determine Antenna Placements and GPS Satellite Coverage for Radio Detection and Tracking in Urban Environments," MPRG Technical Report MPRG-TR-95-14,Virginia Tech, Sep. 1995.

R.K. Marrow, Jr. and T.S. Rappaport, "Gettin In," Wireless Reveiw Magazine. Mar. 2000.

Wireless Valley Communications, Inc., "SitePlanner 3.16 for Windows 95/98/NT User's Manual". Software User's Manual, pp. 5-148 to 5-156, 1999.

M. Panjwani et al., "Interactive Computation of Coverage Regions for Wireless Communications in Multifloored Indoor Environments," IEEE Journal on Selected Areas in Communications, vol. 14, No. 3, Apr. 1996.

L. Piazzi and J.L. Bertoni, "Achievable Accurracy of Site-Specific Path-Loss Predictions in Residential Environments" IEEE Transactions on Vehicular Technology, vol. 48, No. 3, May 1999.

T.S. Rappaport et al., "Wireless Communications: Past Events and a Future Perspective", IEEE Communications Magazine, May 2002.

T.S. Rappaport et al., "Radio Propagation Prediction Techniques and Computer-Aided Channeling Modeling for Embedded Wireless Microsystems," ARPA Annual Report, MPRG Technical Report MPGR-TR-94-12, Virginia Tech, Jul. 1994.

T.S., Rappaport et al., "Use of Topographic Maps with Building Information to Determine Antenna Placements for Radio Detection and Tracking in Urban Environments," MPRG Technical Report MPRG-TR-95-14, Virginia Tech, Nov. 1995.

D. Ullmo et al., "Wireless Propagation in Buildings: A Statistical Scattering Approach," IEEE Transactions on Vehicular Technology, vol. 48, No. 3, May 1999.

T.S. Rappapoprt, "wireless Communications: Principles and Practice" Second Edition, Prentice Hall, 2002.

T.S.. Rappaport et al., "Use of Topographic Maps with Building Information to Determine AntennaPlacements and GPS Satellite Coverage for Radio Detection and Tracking in Urban Environments," MPRG Technical Report MPRG-TR-95-14, Virginia Tech, Sep. 1995.

T.S. Rappaport et al., "Indoor Path Loss Measurement for Homes and Apartments at 2.4 and 5.85 GHz," private report produced for Motorola, Dec. 16, 1997.

T.S. Rappaport, "Isolating Interference," Wireless Review Magazine, May 2000.

Slides from T.S. Rappaport and R. Skidmore, "Introduction to In-Building Wireless Systems," Infocast In-Building Wireless Solutions Conference and Exposition, Feb. 4, 2003.

S. Sandhu, M.P. Koushik, and T.S. Rappaport "Predicted Path Loss for Roslyn V.A. First set of predictions for ORD Project on Site Specific Propagation Prediction," MPRG Technical Report MPRG-TR-94-20, Virginia Tech. Dec. 1994.

S. Sandhu, M.P. Koushik and T.S. Rappaport, "Predicted Path Loss for Roslyn, VA. First set of predictions for ORD Project on Site Specific Propagation Prediction" MPRG Technical Report MPRG-TR-94-20, Virginia Tech. Mar. 1995.

S. Seidel et al., "Site-Specific Propagation Prediction for Wireless In-Building Personal Communication Design," IEEE Transactions on Vehicular Technology, vol. 43, No. 4, Nov. 1994.

S. Shakkattai and T.S. Rappaport, "Research Challenges in Wireless Networks: A Technical Overview," Proceeding of the Fifth International Symposium on Wireles Personal Multimedia Communications, Honolulu, HI, Oct. 2002.

H. Sherali et al., "On the Optimal Location of Transmitters for Microcellular Radio Communication System Design," IEEE Journal on Selected Areas in Communications, vol. 14, No. 3, pp. 662-673, May 1996.

R. Skidmore et al., "A Comprehensive In-Building and Microcellular Wireless Communication System Design Tool" The Bradley Department of Electrical Engineering, MPRG-TR-97-13, Jun. 1997. Master's Thesis—unpublished by Virginia Tech for 2 years after submission.

R. Skidmore, et al., Russell Senate Office Building Propagation Study, Project Report for Joseph R. Loring & Associates; "Project Update," AoC Contract # Acbr96088; prepared for Office of the Architect of the Capital, Jan. 19, 1997.

R. Skidmore, et al., Russell Senate Office Building Propagation Study, Project Report for Joseph R. Loring & Associates; "Assessment and Study of the Proposed Enhancements of the Wireless Communications Environment of the Russell Senate Office Building (RSOB) and Associated Utility Tunnels," AoC Contract # Acbr96088, prepared for Office of the Architect of the Capitol, Feb. 20, 1997.

R. Torres et al., "CINDOOR: An Engineering Tool for Planning and Design of Wireless Systems in Enclosed Spaces," IEEE Antennas and Propagation Magazine, vol. 41, No. 4 Aug. 1999.

R. Skidmore et al., "Interactive Coverage Region and System Design Simulation for Wireless Communication Systems in Multi-Floored Indoor Environments: SMT Plus *tm*," IEEE ICUPC Proceedings, 1996.

T.S. Rappaport et al., "Radio Propagation Prediction Techniques and Computer-Aided CHannel Modeling for Embedded Wireless Microsystems," MPRG Tech. Report MPRG-TR-95-08, Virginia Tech, Jul. 1995.

Company Web Page "Actix" www.actix.com product name: E-NOS (now E-AMS).

Company Web Page "Agilent" www.agilent.com product name: OPAS32.

Company Web Page "Agilent" www.agilent.com product name: Wizard.

Company Web Page "Comarco" www.edx.com product name: SignalPro.

Company Web Page" ComOpt" www. comopt.com. product name: CellOpt AFP.

Company Web Page "Lucent" www.bell-labs.com product name: WiSE.

Company Web Page "Ericsson" www.ericsson.com product name: TEMS Lite.

Company Web Page"Ericsson" www.ericcson.com product name: TEMS.

Company Web Page "Marconi" www.marconi.com product name: PiaNET.

Comapny Web Page "Marconi" www.marconi.com product name: decibelPlanner.

Company Web Page "Schema" www.schema.com product name: Optimizer.

Company Web Page "ScoreBoard" www.scoreboard.com product name: ScoreBoard.

Sotfware by Andrew titled "RF Planner" dated Jul. 17, 1997.

A user guide titled "Andrew Microwave System Planner" dated Jul. 1999.

A user guide tilted "Andrew Antenna System Planner" Jun. 1999.

"CoCreate Announces New Release of SolidDesigner; First System Enabling Users to Attach Parameters to Imported CAD Models", Business Wire, p0286, Apr. 7, 1999.

Smith, Alan, "Speedy MicroStation release does 95", Machine Design, v68, n10, p98(1), May 23, 1996.

"Latest new products. (New Briefs)", Communications News, 37, 5, 98, May 2000.

Tolputt, Elvadia, "ICL moves to consolidate its hold on the manufacturing market with OMAC 2000 under VME", Computergram International, n1371, CGIO2230010, Feb 23, 1990.

Trappey et al, "Object-oriented bill of materials system for dynamic product management", Journal of Intelligent Manufacturing, v7, n5, Oct. 1996, p365-371.

Gonzales, Daniel M., "ArchiCAD 4.02", Macworld, Jun. 1, 1992, v9, n6, p199, 201, 2 pages.

S. Sandip et al., "Predicted Path Loss for Rosslyn, VA", The Bradley Department of Electrical Engineering, MPRG TR-95-03, Virginia Tech, Mar. 5, 1995.

S. Sandip et al., "Predicted Path Loss for Rosslyn, VA", The Bradley Department of Electrical Engineering, First Set of Predictions, MPRG TR-94-20, Virginia Tech, Dec. 9, 1994.

G. Durgin, et al., "Measurements and Models for Radio Path Loss and Penetration Loss in and Around Homes and Trees at 5.85 GHz", IEEE Transactions on Communications, vol. 46, No. 11, Nov. 1998.

R. Skidmore et al., "A Comprehensive In-Building and Microcellular Wireless Communication System Design Tool", The Bradley Department of Electrical Engineering, MPRG-TR-97-13, Jun. 9, 1997.

T. Rappaport, et al., "Radio Propagation Prediction Techniques and Computer-Aided Channel Modeling for Embedded Wireless Microsystems", The Bradley Department of Electrical Engineering, ARPA Annual Report, Jul. 1994.

T. Rappaport, et al., "Radio Propagation Prediction Techniques and Computer-Aided Channel Modeling for Embedded Wireless Microsystems", The Bradley Department of Electrical Engineering, ARPA Semi-Annual Report, Jul. 1995.

T. Rappaport et al., "Use of Topographic Maps With Building Information to Determine Antenna Placements and GPS Satellite Coverage for radio Detection and Tracking in Urban Environments", The Bradley Department of Electrical Engineering, Quarterly Report, Sep. 1995.

T. Rappaport et al., "Use of Topographic Maps With Building Information to Determine Antenna Placements and GPS Satellite Coverage for radio Detection and Tracking in Urban Environments", The Bradley Department of Electrical Engineering, MPRG-TR-95-19, Nov. 1995.

R. Skidmore et al., "Interactive Coverage Region and System Design Simulation for Wireless Communication Systems in Multi-floored Indoor Environments, SMT *Plus*" IEEE ICUPC '96 *Proceedings*.

"Site Planner 3.16 for Windows 95/98/NT User's Manual" (Wireless Valley Communications, Inc. 1999), pp. 5-148 to 5-156.

Bell Laboratories, "Wise —A Wireless System Engineering Tool", *pub. date unknown*, web pages from http://www.bell-labs.com.

Mobile Systems International, "Planet", *pub. date unknown*, web pages from http://www.msi-swe.sc.

EDX Engineering, Inc., "EDX Engineering—Products: Version 2.0 of EDX SignalPro(tm)", *pub. date unknown*, web pages from http://www.edx.com.

Ericsson Wireless Communications, "TEMS Total—TEMS Product Overview", *pub. date unknown*, web pages from http://www.ericsson.com.

Ericsson Wireless Communications, "TEMS Total—TEMS Frequently asked questions—general", *pub. date unknown*, web pages from http://www.ericsson.com.

Ericsson Wireless Communications, "TEMS Total—TEMS Light Frequently asked questions—general", *pub. date unknown*, web pages from http://www.ericsson.com.

Ericsson Wireless Communications, "TEMS Total—Tems Makes Your Net Work", *pub. date unknown*, web pages from http://www.ericsson.com.

D. Ullmo et al., "Wireless Propagation in Buildings: A Statistical Scattering Approach", IEEE Transactions on Vehicular Technology, vol. 48, No. 3, May 1999.

S. Seidel et al., "Site-Specific Propagation Prediction for Wireless In-Building Personal Communication System Design", IEEE Transactions on Vehicular Technology, vol. 43, No. 4, Nov. 1994.

M. Panjwani et al., "Interactive Computation of Coverage Regions for Wireless Communication in Multifloored Indoor Environments", IEEE Journal on Selected Areas in Communications, vol. 14, No. 3, Apr. 1996.

C. M. Peter Ho, et al., "Antenna Effects on Indoor Obstructed Wireless Channels and a Deterministic Image-Based Wide-Band Propagation Model for In-Building Personal Communication Systems", International Journal of Wireless Information Networks, vol. 1, No. 1, 1994.

S. Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.

L. Piazzi et al., "Achievable Accuracy of Site-Specific Path-Loss Predictions in Residential Environments", IEEE Transactions on Vehicular Technology, vol. 48, No. 3, May 1999.

Article "Building Database Manipulator" Copyright, Jan. 1998; MPRG and Virginia Tech.

PCS 97 Track 7; Engineering & Systems Managements; T. Rappaport.

Propagator; vol. 8, No. 3; Fall 1997.

SMT Plus 1.0 User's Manual; R. Skidmore & T. Rappaport; Copyright, Aug. 1996; Virginia Tech.

```
┌─────────────────────────────────────────────────────┬───┐
│       BILL OF MATERIALS FOR CURRENT DRAWING         │ ✕ │
├─────────────────────────────────────────────────────┼───┤
│                                                     │ ▲ │
│                                                     │   │
│   SUBTOTAL (EXCLUDING BASE STATION CDMA1): $0.00    │   │
│                                                     │   │
│   BASE STATION: MACROCELL                           │   │
│   DESCRIPTION: CDMA MACROCELL                       │   │
│   FLOOR1                                            │   │
│   POSITION: 84.3, 44.0, 1.8                         │   │
│   CHANNEL SET: MACROCELL: IS-95A CDMA DEFAULT       │   │
│   SUBCHANNEL SET: DEFAULT CHANNEL SET               │   │
│   TXPOWER: 10.00 dBm                                │   │
│   RF BANDWIDTH: 1.25 MHz                            │   │
│   RECEIVER NOISE FIGURE: 0.00 dB                    │   │
│   CHANNELS ASSIGNED TO BASE STATION                 │   │
│     1                                               │   │
│                                                     │   │
│   NAME: ALLENTEL PCN PANEL 1710-1990 92 Deg 9.00 dB GAIN │
│   TYPE: ANTENNA_POINT                               │   │
│   MANUFACTURER: ALLEN TELECOM                       │   │
│   PART NUMBER: DB972 1850                           │   │
│   FREQUENCY: 1710-1990 MHz                          │   │
│   PATTERN FILE: 972_185.ant                         │   │
│   FLOOR1                                            │   │
│   POSITION: 84.3, 44.0, 1.8                         │   │
│   COST: $0.00  —1612                                │   │
│                                                     │   │
│   SUBTOTAL (EXCLUDING BASE STATION MACROCELL): $0.00 —1613 │
│                                                     │   │
│   TOTAL COST (EXCLUDING BASE STATIONS): $0.00 —1614 │ ▼ │
└─────────────────────────────────────────────────────┴───┘
┌───────────────────────────────────┐  ┌──────────┐
│        SAVE TO ASCII FILE         │  │    OK    │
└───────────────────────────────────┘  └──────────┘
```

1610 brackets the BASE STATION block; 1611 brackets the NAME/antenna block.

*FIG. 16*

```
┌────────────────────────────────────────────────┐
│ BILL OF MATERIALS FOR CURRENT DRAWING      ⊠  │
├────────────────────────────────────────────────┤
│  TYPE: ANTENNA_POINT                       ▲  │
│  MANUFACTURER: ALLEN TELECOM                  │
│  PART NUMBER: DB972 1850                      │
│  FREQUENCY: 1710-1990 MHz                     │
│  PATTERN FILE: 972_185.ant                    │
│  FLOOR1                                       │
│  POSITION: 84.3, 44.0, 1.8                    │
│  COST: $250.00 —1612a                         │
│                                               │
│  NAME: 7/8*, 50- OHM FOAM DIELECTRIC COAXIAL CABLE* │
│  TYPE: CABLE                                  │
│  MANUFACTURER: ANDREW                         │
│  PART NUMBER: LDF5*                           │
│  FREQUENCY: 2000MHz                           │
│  LENGTH: 120.41 m (395.06ft)                  │
│  LOSS PER 100 m; 6.46 dB                      │
│  TOTAL LOSS:7.70 dB                           │
│  POSITION:                                    │
│  VERTEX0: 10.6, 0.8, 1.8                      │
│  VERTEX1: 1.7, 2.8, 1.8                       │
│  VERTEX2: 1.7, 31.0, 1.8                      │
│  VERTEX3: 35.3, 31.0, 1.8                     │
│  VERTEX4: 35.3, 23.5 1.8                      │
│  VERTEX5: 65.4, 23.6, 1.8                     │
│  VERTEX6: 72.6, 32.0, 1.8                     │
│  COST: $85.00 —1721                           │
│                                               │
│  SUBTOTAL (EXCLUDING BASE STATION MACROCELL): $470.00—1613a │
│                                               │
│  TOTAL COST (EXCLUDING BASE STATIONS): $470.00—1614a  ▼ │
└────────────────────────────────────────────────┘
┌────────────────────────────┐  ┌──────────┐
│      SAVE TO ASCII FILE    │  │    OK    │
└────────────────────────────┘  └──────────┘
```

1611 brackets the first block (ANTENNA_POINT through COST: $250.00)
1720 brackets the second block (CABLE through COST: $85.00)

*FIG. 17*

METHOD AND SYSTEM FOR GENERATING A REAL TIME BILL OF MATERIALS AND EVALUATING NETWORK PERFORMANCE

CROSS-REFERENCE TO RELATED APPLICATIONS

This application is a continuation of U.S. patent application Ser. No. 09/318,842, filed May 26, 1999, now U.S. Pat. No. 6,493,679, and is related to U.S patent application Ser. No. 09/318,841, now U.S. Pat. No. 6,850,946, and U.S. patent application Ser. No. 09/318,840, now U.S. Pat. No. 6,317,599 the complete contents of which are incorporated herein by reference.

BACKGROUND OF THE INVENTION

1. Field of the Invention

The present invention generally relates to engineering and management systems for the design of wireless communications networks and, more particularly, to a method for managing a real time bill of materials when designing, evaluating or optimizing the performance and/or costs of a wireless communication system using a three-dimensional (3-D) representation of the environment.

2. Background Description

As wireless communications use increases, radio frequency (RF) coverage within buildings and signal penetration into buildings from outside transmitting sources has quickly become an important design issue for wireless engineers who must design and deploy cellular telephone systems, paging systems, or new wireless systems and technologies such as personal communication networks or wireless local area networks. Designers are frequently requested to determine if a radio transceiver location, or base station cell site can provide reliable service throughout an entire city, an office, building, arena or campus. A common problem for wireless systems is inadequate coverage, or a "dead zone," in a specific location, such as a conference room. It is now understood that an indoor wireless PBX (private branch exchange) system or wireless local area network (WLAN) can be rendered useless by interference from nearby, similar systems. The costs of in-building and microcell devices which provide wireless coverage within a 2 kilometer radius are diminishing, and the workload for RF engineers and technicians to install these on-premises systems is increasing sharply. Rapid engineering design and deployment methods for microcell and in-building wireless systems are vital for cost-efficient build-out.

Analyzing radio signal coverage penetration and interference is of critical importance for a number of reasons. A design engineer must determine if an existing outdoor large scale wireless system, or macrocell, will provide sufficient coverage throughout a building, or group of buildings (i.e., a campus). Alternatively, wireless engineers must determine whether local area coverage will be adequately supplemented by other existing macrocells, or whether indoor wireless transceivers, or picocells, must be added. The placement of these cells is critical from both a cost and performance standpoint. If an indoor wireless system is being planned that interferes with signals from an outdoor macrocell, the design engineer must predict how much interference can be expected and where it will manifest itself within the building, or group of buildings. Also, providing a wireless system that minimizes equipment infrastructure cost as well as installation cost is of significant economic importance. As in-building and microcell wireless systems proliferate, these issues must be resolved quickly, easily, and inexpensively, in a systematic and repeatable manner.

There are many computer aided design (CAD) products on the market that can be used to design the environment used in one's place of business or campus. WiSE from Lucent Technology, Inc., SignalPro from EDX, PLAnet by Mobile Systems International, Inc., and TEMS and TEMS Light from Ericsson are examples of wireless CAD products. In practice, however, a pre-existing building or campus is designed only on paper and a database of parameters defining the environment does not readily exist. It has been difficult, if not generally impossible, to gather this disparate information and manipulate the data for the purposes of planning and implementation of indoor and outdoor RF wireless communication systems, and each new environment requires tedious manual data formatting in order to run with computer generated wireless prediction models. Recent research efforts by AT&T Laboratories, Brooklyn Polytechnic, and Virginia Tech, are described in papers and technical reports entitled "Radio Propagation Measurements and Prediction Using Three-dimensional Ray Tracing in Urban Environments at 908 MHZ and 1.9 GHz," (*IEEE Transactions on Vehicular Technology*, VOL. 48, No. 3, May 1999), by S. Kim, B. J. Guarino, Jr., T. M. Willis III, V. Erceg, S. J. Fortune, R. A. Valenzuela, L. W. Thomas, J. Ling, and J. D. Moore, (hereinafter "Radio Propagation"); "Achievable Accuracy of Site-Specific Path-Loss Predictions in Residential Environments," (*IEEE Transactions on Vehicular Technology*, VOL. 48, No. 3, May 1999), by L. Piazzi and H. L. Bertoni; "Measurements and Models for Radio Path Loss and Penetration Loss In and Around Homes and Trees at 5.85 Ghz," (*IEEE Transactions on Communications*, Vol. 46, No. 11, November 1998), by G. Durgin, T. S. Rappaport, and H. Xu; "Radio Propagation Prediction Techniques and Computer-Aided Channel Modeling for Embedded Wireless Microsystems," ARPA Annual Report, MPRG Technical Report MPRG-TR-94-12, July 1994, 14 pp., Virginia Tech, Blacksburg, by T. S. Rappaport, M. P. Koushik, J. C. Liberti, C. Pendyala, and T. P. Subramanian; "Radio Propagation Prediction Techniques and Computer-Aided Channel Modeling for Embedded Wireless Microsystems," MPRG Technical Report MPRG-TR-95-08, July 1995, 13 pp., Virginia Tech, Blacksburg, by T. S. Rappaport, M. P. Koushik, C. Carter, and M. Ahmed; "Use of Topographic Maps with Building Information to Determine Antenna Placements and GPS Satellite Coverage for Radio Detection & Tracking in Urban Environments," MPRG Technical Report MPRG-TR-95-14, Sep. 15, 1995, 27 pp., Virginia Tech, Blacksburg, by T. S. Rappaport, M. P. Koushik, M. Ahmed, C. Carter, B. Newhall, and N. Zhang; "Use of Topographic Maps with Building Information to Determine Antenna Placement for Radio Detection and Tracking in Urban Environments," MPRG Technical Report MPRG-TR-95-19, November 1995, 184 pp., Virginia Tech, Blacksburg, by M. Ahmed, K. Blankenship, C. Carter, P. Koushik, W. Newhall, R. Skidmore, N. Zhang and T. S. Rappaport; "A Comprehensive In-Building and Microcellular Wireless Communications System Design Tool," MPRG-TR-97-13, June 1997, 122 pp., Virginia Tech, Blacksburg, by R. R. Skidmore and T. S. Rappaport; "Predicted Path Loss for Rosslyn, Va.," MPRG-TR-94-20, Dec. 9, 1994, 19 pp., Virginia Tech, Blacksburg, by S. Sandhu, P. Koushik, and T. S. Rappaport; "Predicted Path Loss for Rosslyn, Va., Second set of predictions for ORD Project on Site Specific Propagation Prediction" MPRG-TR-95-03, Mar. 5, 1995, 51 pp., Virginia Tech, Blacksburg, by S. Sandhu, P. Koushik, and T. S. Rappaport. These papers and technical reports are illustrative of the state of the art in site-specific propagation modeling and show the difficulty in obtaining databases for city environments, such as Rosslyn, Va. While the above papers describe a research comparison of measured vs. predicted signal coverage, the works do not demonstrate a systematic, repeatable and fast methodology for creating an environmental database, nor do they report a method for analyzing system performance or visualizing and placing various wireless equipment components that are required to provide signals in the deployment of a wireless system in that environment.

While there are many methods available for designing wireless networks that provide adequate coverage, there is no easy method to ensure that the system will be cost effective. For instance, even though the coverage may be more than adequate, given the chosen wireless infrastructure components, the total cost of the system could be prohibitive.

SUMMARY OF THE INVENTION

It is an object of the invention to provide a rapid and automated method for generating a bill of materials and cost information in real time, as components for a desired wireless communication system are specified and/or replaced by substitute components, while continuously predicting wireless system performance. This automatic method for comparing the cost and performance of competing products or competing design methodologies, in real time, offers a significant value for wireless engineers and provides a marked improvement over present day techniques.

According to the invention, a design engineer builds a model of the desired wireless communications system and specifies each component necessary to provide sufficient or optimal system performance. A parts list is maintained, in real time, that contains a definition of each system component and its associated performance and cost parameters. Using this method, the user is able to rapidly change the physical location of components within the wireless system in order to investigate alternative designs which may use different components, such as antennas, cables; or use different RF distribution methods and/or various types of coaxial or optical splitter systems, etc. Cost parameters include both component costs and installation costs. As the system is changed through a series of "what-if" scenarios, components are replaced with substitute components, cable lengths are modified, antenna systems and base stations are re-positioned to alternate locations, etc.

Each time a component is added to or deleted from the system model, the bill of materials is automatically updated and component costs, total costs, and altered system performance specifications are immediately available to the design engineer. The designer may choose to swap components for less expensive components. The performance characteristics of the system are automatically updated as cost choices are made to enable the designer to assess the changes in performance and cost at the same time.

BRIEF DESCRIPTION OF THE DRAWINGS

The foregoing and other objects, aspects and advantages will be better understood from the following detailed description of a preferred embodiment of the invention with reference to the drawings, in which:

FIG. 16 shows a bill of materials summary for a drawing, according the preferred embodiment of the invention;

FIG. 17 shows a bill of materials summary for a drawing after costs have been added to a database, according the preferred embodiment of the invention.

DETAILED DESCRIPTION OF A PREFERRED EMBODIMENT OF THE INVENTION

Design of Wireless Communication Systems

Using the present method, it is now possible to assess the RF environment in a systematic, organized fashion by quickly viewing signal strength, or interference levels, or other wireless system performance measures. The current embodiment is designed specifically for use with the SitePlanner™ suite of products available from Wireless Valley Communications, Inc. of Blacksburg, Va. However, it will be apparent to one skilled in the art that the method could be practiced with other products either now known or to be developed in the future. (SitePlanner is a trademark of Wireless Valley Communications, Inc.)

Figure 1:
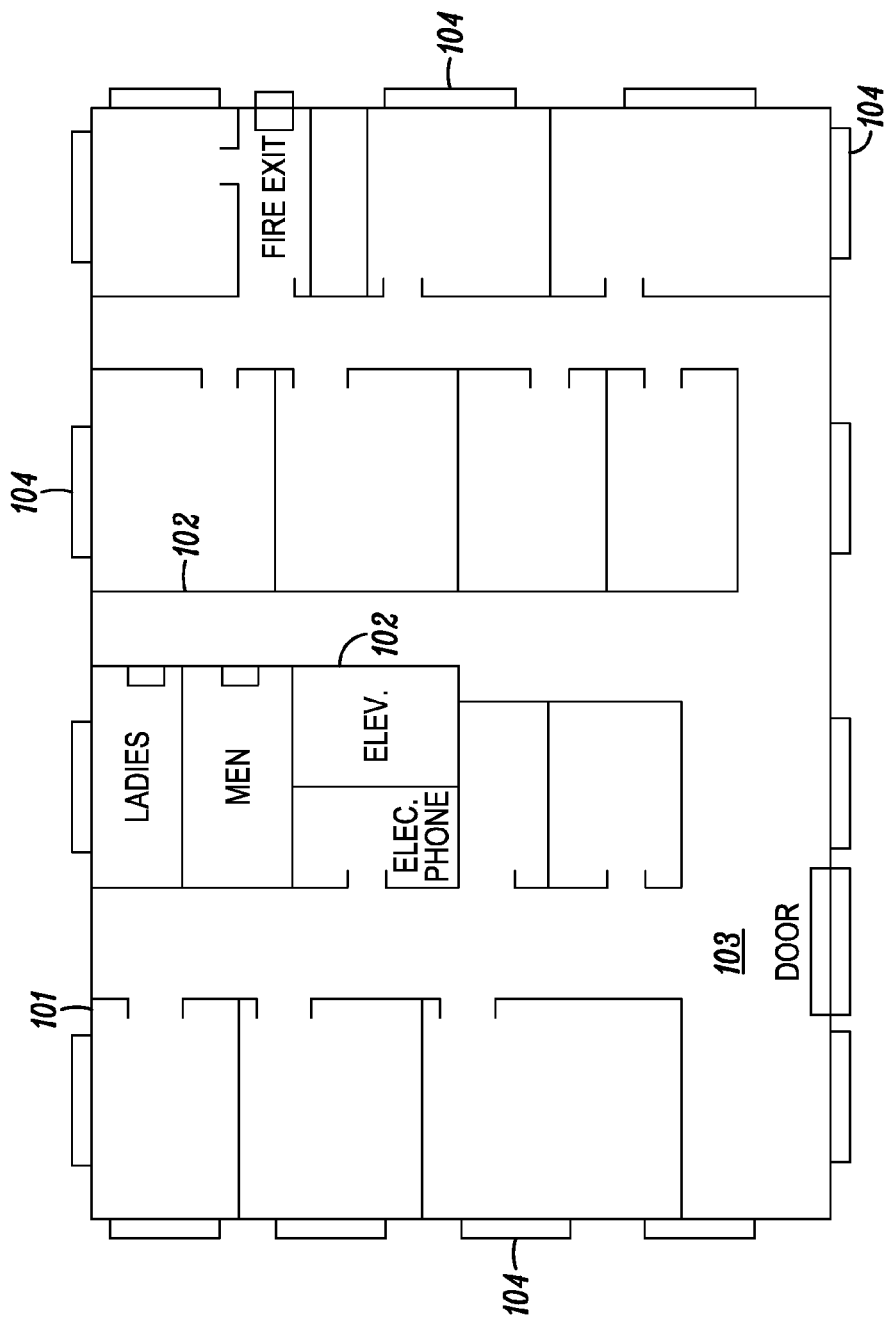
FIG. 1 shows an example of a simplified layout of a floor plan of a building.

Referring now to FIG. 1, there is shown a two-dimensional (2-D) simplified example of a layout of a building floor plan. The method uses 3-D computer aided design (CAD) renditions of a building, or a collection of buildings and/or surrounding terrain and foliage. However, for simplicity of illustration a 2-D figure is used. The various physical objects within the environment such as external walls 101, internal walls 102 and floors 103 are assigned appropriate physical, electrical, and aesthetic values. For example, outside walls 101 may be given a 10 dB attenuation loss, signals passing through interior walls 102 may be assigned 3 dB attenuation loss, and windows 104 may show a 2 dB RF penetration loss. In addition to attenuation, the obstructions 101, 102 and 103 are assigned other properties including reflectivity and surface roughness.

Estimated partition electrical properties loss values can be extracted from extensive propagation measurements already published, which are deduced from field experience, or the partition losses of a particular object can be measured directly and optimized instantly using the present invention combined with those methods described in application Ser. No. 09/221,985, now U.S. Pat. No. 6,442,507. Once the appropriate physical and electrical parameters are specified, any desired number of hardware components of RF sources can be placed in the 3-D building database, and received signal strengths (RSSI), network throughput, bit or frame error rate, or carrier-to-interference (C/I) ratios can be plotted directly onto the CAD drawing. The 3-D environment database could be built by a number of methods, the preferred method being disclosed in application Ser. No. 09/318,841, now U.S. Pat. No. 6,850,946. Traffic capacity analysis, frequency planning, co-channel interference analysis can be performed in the invention along with RF coverage prediction. Other system performance metrics may be easily incorporated by one skilled in the art through well known equations.

Figure 2:
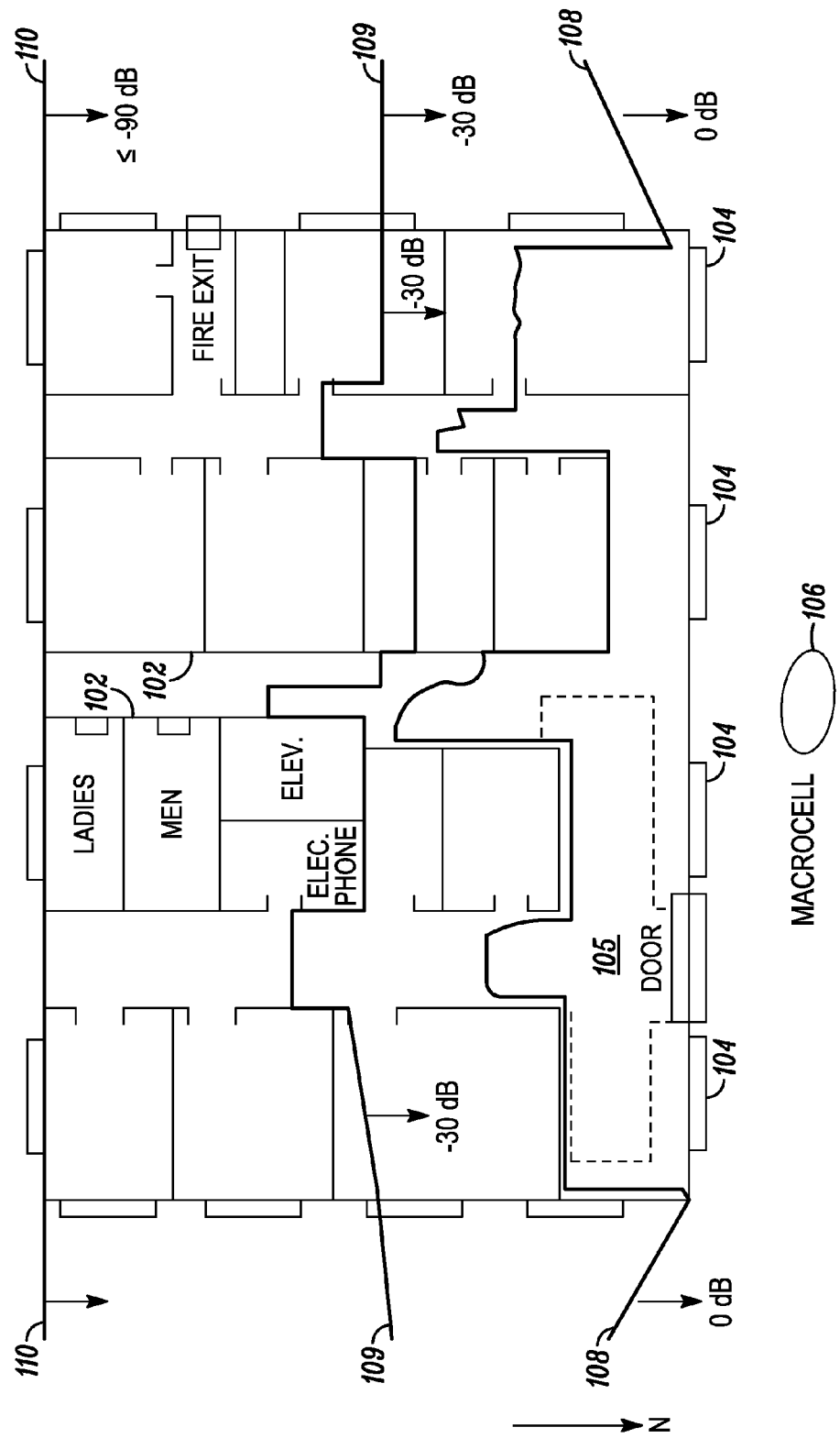
FIG. 2 shows effective penetration of Radio Frequency (RF) transmission into a building from a macrocell.

FIG. 2 depicts effective RF penetration into the building from the distant macrocell using a close-in virtual macrocell transmitting into the lossless distributed antenna.

Referring to FIG. 2, there are several windows 104, and even a large glass foyer 105, on the north wall of the building, so RF penetration into this part of the building is quite good, as shown by contour lines 108 and 109 for 0 dB and −30 dB, respectively. Even so, interior walls 102 cause signal levels in some areas to drop below a minimum useable signal strength of about −90 dBm, especially in some of the southern rooms, as shown by contour line 110. Consequently, macrocell coverage there will probably be poor.

Other outdoor macrocells can be modeled in the same way, and their signal strength contours plotted, to determine if hand-offs can compensate for the inadequacies of the macrocell north of the building. If not, then indoor picocells (and their distributed feed systems, antennas, and antenna patterns) can be easily added if necessary, and their performance checked using the method, to complement coverage provided by the macrocells.

The mathematical propagation models used to predict and optimize antenna positioning in a desired environment may include a number of predictive techniques models, such as those described in the previously cited and following technical reports and papers: "Interactive Coverage Region and System Design Simulation for Wireless Communication Systems in Multi-floored Indoor Environments, SMT Plus," *IEEE ICUPC '96 Proceedings*, by R. R. Skidmore, T. S. Rappaport, and L. Abbott which is hereby incorporated by reference. Some simple models are also briefly described in "SitePlanner 3.16 for Windows 95/98/NT User's Manual" (Wireless Valley Communications, Inc. 1999), hereby incorporated by reference. It would be apparent to one skilled in the art how to apply other system performance models to this method.

Interference, instead of radio signal strength, is the dominant performance-limiting factor in many situations due to increased wireless communications use. Modeling interference from any source to an established or contemplated wireless system is straightforward using the method. Suppose, for example, that an indoor wireless communication system is assigned a frequency set identical to that of an outdoor wireless system. Although the indoor system may provide sufficient RSSI throughout its coverage area, interference from the outside system may still render the indoor wireless system ineffectual in certain parts of the building.

Caution must be used, however, when modeling and analyzing interference, since the detrimental effect may also depend upon technologies and/or signal processing technologies, not just signal power levels. For example, a geographic area could have similar narrowband and/or wideband in the 800 MHZ cellular bands, for instance with Advanced Mobile Phone System (AMPS) and Code Division Multiple Access (CDMA) systems, but users using either technology may be able to coexist if their respective demodulation processes reject interference provided by the undesired system. The current embodiment of this invention allows the user to select the air interface/technology being used by the wireless system being designed and automatically adjusts the prediction of interference accordingly.

Figure 3:
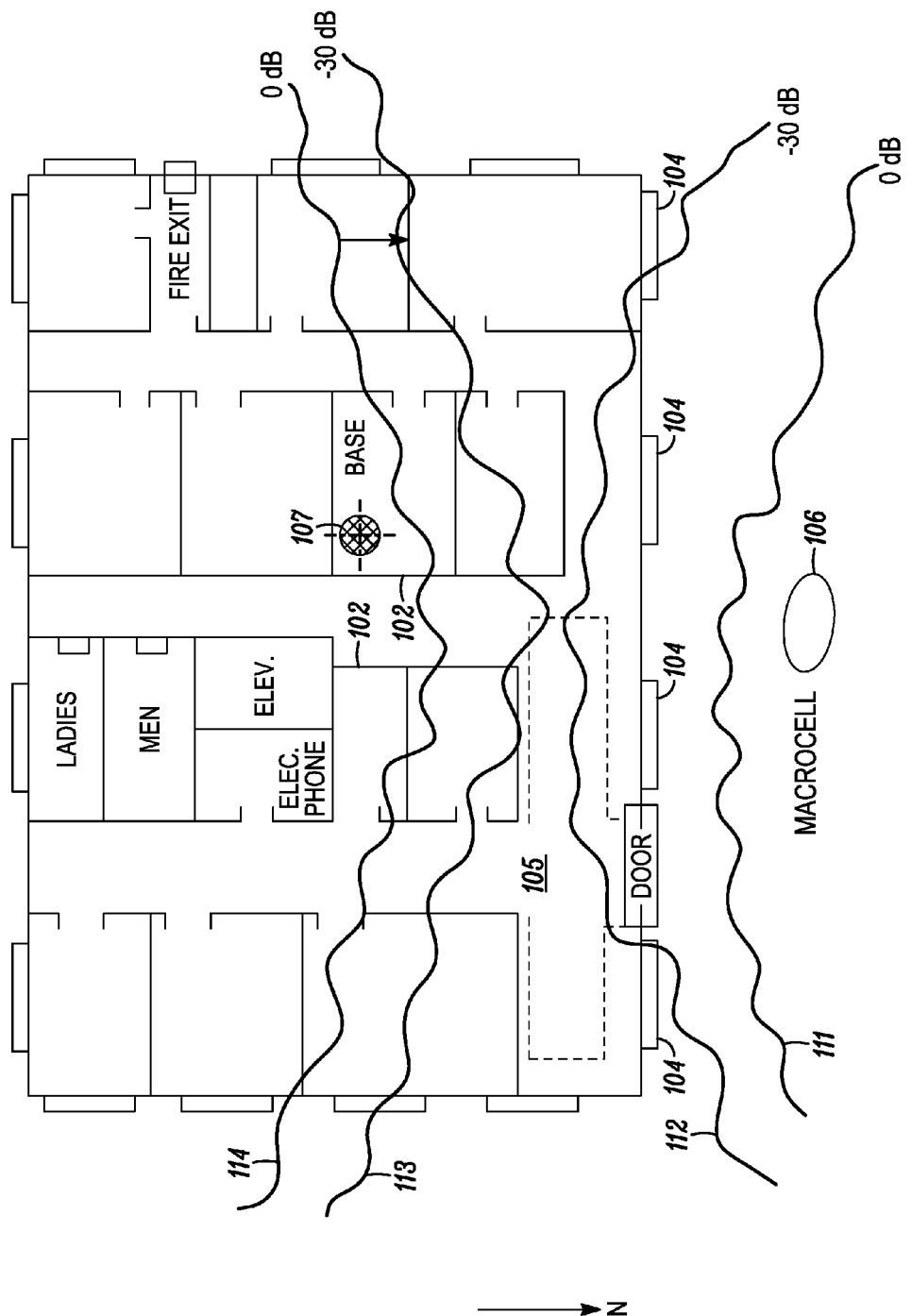
FIG. 3 shows a simplified layout of a floor plan of a building including an outdoor macrocell and an indoor base station.

FIG. 3 shows another rendition of the office building example, but an indoor wireless system 107 has been added. In this example, 800 MHZ AMPS technology is assigned to both transmitters 106 and 107. Differing wireless standards and technologies such as CDMA and Global System Mobile (GSM) could have been selected as well. The present invention uses a database to represent the exact physical air interface standards of a wide range of technologies and may be easily edited for future interface standards. As new technologies are developed, one skilled in the art could easily modify this invention to include the new technologies.

The outdoor wireless system 106 is now interfering with the indoor network, and the effect is checked by plotting C/I contours 111 and 112 at 0 dB and −30 dB, respectively, for the outdoor system and also plotting C/I contours 113 and 114 at 0 dB and −30 dB for the indoor system. The 0 dB contour 114 shows where the desired and interfering signal levels are equal, so the interfering outdoor system's signal predominates in areas outside this contour. It is obvious that the indoor network is rendered useless throughout many parts of the building. There are a number of possible solutions that may be analyzed by a designer using the present invention.

One solution is to change the indoor system's antenna location or increase the transmitted power, add more nodes, or select a different frequency set. These changes may be made with the simple click of a mouse in the method of the invention, so that new channel sets, antenna locations, or alternative antenna systems (such as in-building distributed systems, directional antennas, or leaky feeders) may be evaluated quickly, thereby eliminating guesswork and/or costly on-site experimentation with actual hardware. Instead of displaying contours of coverage or interference, the present invention also allows the user to specify fixed or moveable watch points that indicate or display predicted performance in extremely rapid fashion at specific points in the environment.

Figure 4:
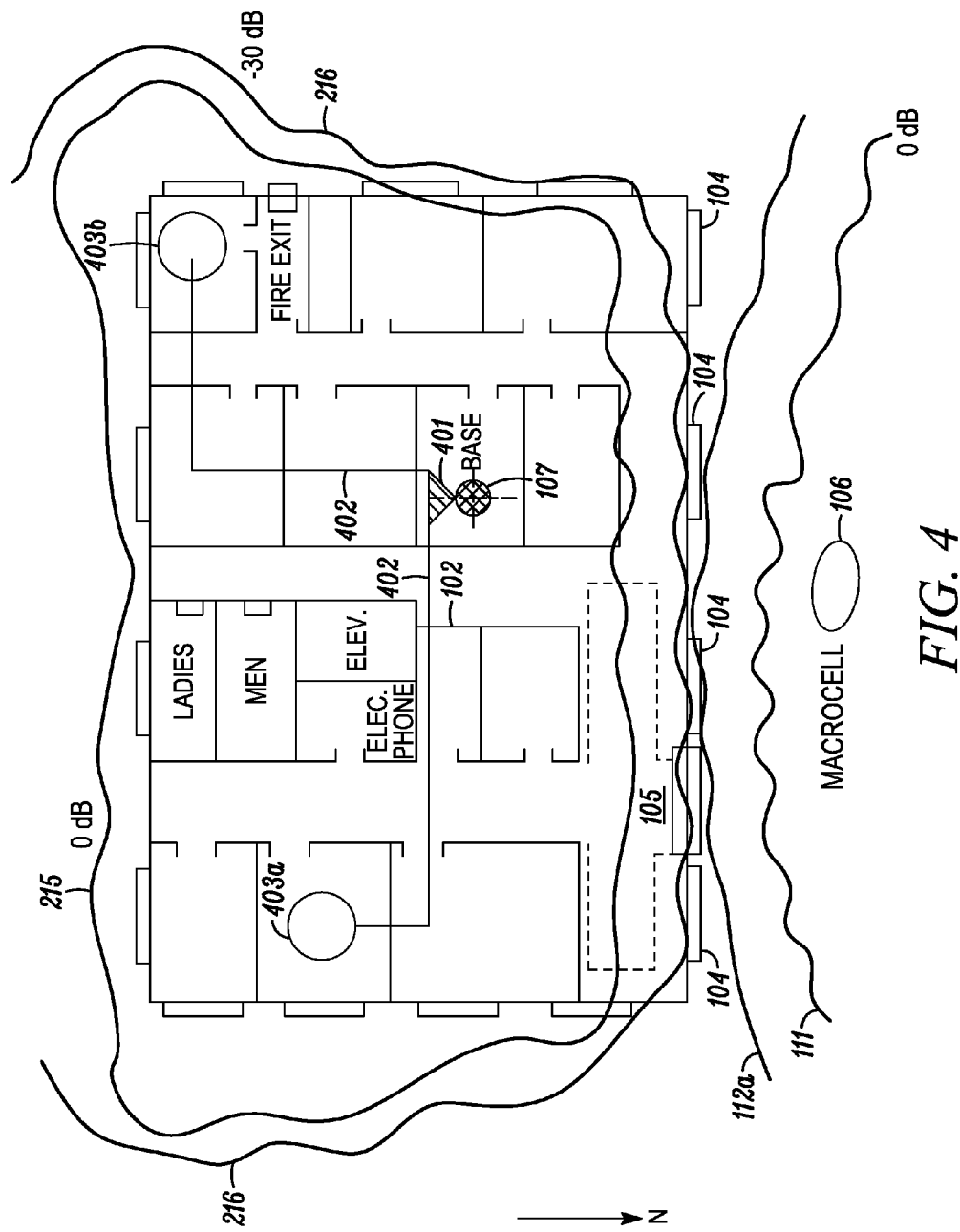
FIG. 4 shows the layout of FIG. 3, but with a revised base station designed to eliminate interference.

For example, FIG. 4 illustrates how the same indoor wireless system of FIG. 3 can provide adequate C/I protection when connected to a distributed indoor antenna system consisting of a two-way splitter 401 (3 dB loss+insertion loss) and two 40 foot cable runs 402 to popular commercial indoor omnidirectional antennas 403. A look at the new 0 dB contour lines 111 and 215, and −30 dB contour lines 112a and 216 show that the coverage inside the building is now adequate; the outdoor system 106 no longer causes significant interference in most parts of the building. Watch points allow a user to instantly determine spot coverage or other system performance without having to wait for the computation and display of contour plots.

The method allows any type of distributed antenna system to be modeled within seconds, while continuously monitoring and analyzing the component and installation cost and resulting link budget, as disclosed below, enabling "what-if" designs to be carried out on the fly with minimum guess work and wasted time.

In the present embodiment of the invention, the designer identifies locations in the 3-D environmental database where certain levels of wireless system performance are desirable or critical. These locations, termed "watch points", are points in three-dimensional space which the designer identifies by visually pointing and/or clicking with a mouse or other input device at the desired location in the 3-D environmental database. Any number of such watch points may be placed throughout the 3-D environment at any location. Watch points may be designated prior to performing a performance prediction on a given wireless communication system, or may be dynamically created by the user at any time during the course of a wireless system performance calculation using the same point and click technique described above.

Watch points provide graphical and/or textual feedback to a designer regarding the wireless system performance throughout the environment. Depending on the type of visual feedback desired by the designer, watch points may take the form of one or more of the following:

A computed number displayed as text that represents received signal strength (RSSI), signal-to-interference ratio (SIR), signal-to-noise ratio (SNR), frame error rate (FER), bit error rate (BER), or other wireless system performance metrics;

A small region of solid color whose shade and/or tint varies relative to some computed wireless system performance metric;

Colored lines linking the watch point location with the location one or more antennas in the wireless communication system, where the color, thickness, and/or other physical aspect of the connecting line varies relative to some computed wireless system performance metric and dependent upon whether the forward or reverse wireless system channel is being analyzed;

Other form designated by the designer; or

Any combination of the above.

In all cases, the graphical and/or textual representation of each watch point is updated in real-time as a result of the instantaneous computation of the wireless system performance metrics, which are linked to the 3-D environmental database, and initiated due to dynamic changes being made to the wireless system configuration and/or watch point position itself by the user. For example, if the user repositions an antenna using the mouse or other input device, the effect of doing so on the overall wireless system performance is computed and the results are displayed via changes in the appearance of watch points. In addition, numerical values predicted at the watch points are displayed in summary in a dialog window and written to a text file for later analysis. This process is described in greater detail in the following sections.

The preferred embodiment of the invention utilizes a 3-D environmental database containing information relevant to the prediction of wireless communication system performance. This information includes but is not limited to the location, and the physical and electromagnetic properties of obstructions within the 3-D environment, where an obstruction could be any physical object or landscape feature within the environment (e.g., walls, doors, windows, buildings, trees, terrain features, etc.), as well as the position and physical and electrical properties of communications hardware to be used or simulated in the environment.

The designer identifies the location and type of all wireless communication system equipment within the 3-D environmental database. This point-and-click process involves the designer selecting the desired component from a computer parts database and then visually positioning, orienting, and interconnecting various hardware components within the 3-D environmental database to form complete wireless communication systems. The preferred embodiment of the computer parts database is more fully described below. The resulting interconnected network of RF hardware components (commonly known as a wireless distributed antenna) is preferably assembled using either a drag and drop technique or a pick and place and is graphically displayed overlaid upon the 3-D environmental database, and utilizes electromechanical information available for each component via the parts list library in order to fully describe the physical operating characteristics of the wireless communication system (e.g., the system noise figure, antenna radiation characteristics, frequencies, etc.). This information is directly utilized during the prediction of wireless system performance metrics and is discussed later.

The present invention represents a dramatic improvement over prior art by providing the design engineer with instant feedback on wireless system performance metrics as the user alters the physical location transmitter, receivers, and other components, or otherwise modifies the antenna system. The current embodiment utilizes the concept of watch points to implement this. Multiple methods of display and a wide range of settings are available for the designer to use in optimizing antenna placement based upon wireless system performance values displayed at each watch point. One skilled in the art could see how watch points as they are herein described could apply to different implementations as well. Descriptions of the different techniques implemented in the current invention are provided in the following sections.

One form of the method allows the designer to dynamically alter the position, orientation, and/or type of any hardware component utilized within a wireless communication system modeled in a 3-D environmental database. Using this technique, the designer may identify watch points representing critical areas of the 3-D environment that require a certain level of wireless system performance. Such areas could include the office of the Chief Executive Officer (CEO) of a company, a conference room, a city park, or the office of a surgeon on call. Next the designer selects the component of interest within the wireless system. In the present invention, this would be the selection of an antenna or leaky feeder antenna, for example, but one skilled in the art could see that this could be any physical antenna system component. Once the desired hardware component is selected, the designer may begin making changes to the state of the component. For example, by moving the mouse or other input device cursor, the user could effectively relocate the selected component to another position in the 3-D environmental database. This involves the user visually moving the mouse cursor, in real-time, such that the cursor resides in another portions of the 3-D database. The present invention recalculates wireless system performance based upon RSSI, SIR, SNR, FER, BER, or other metric, incorporating the user's desired change in the position of the selected component.

The calculations combine the electromechanical properties of each component in the wireless communication system (e.g., noise figure, attenuation loss or amplification, antenna radiation pattern, etc.), the electromagnetic properties of the 3-D environmental database, and radio wave propagation techniques (detailed later) to provide an estimate of the wireless system performance. Calculations are performed at each watch point the user has identified, and the graphical display of the watch point is updated to reflect the result of the calculations.

As the user moves the mouse cursor and effectively repositions the selected component, the overall performance of the wireless communication system may be altered. For example, if the selected component is an antenna, repositioning the antenna changes the origination point of radio wave signals being broadcast from the antenna, and can thus dramatically change the reception of adequate RF signal throughout the environment. Because the graphical display of the watch points is updated in real-time as the selected component is repositioned, the designer is provided instant feedback on the revised wireless system performance, and can make design decisions based upon the viability of multiple proposed locations and/or wireless system configurations rapidly.

In addition to the functionality described above, the designer is free to add additional watch points in any location within the 3-D environmental database at any time during a wireless system performance prediction. In the current implementation, the designer clicks with the mouse or other input device on the desired location in the 3-D environmental database to create a new watch point at the selected location that is then updated throughout the remainder of the performance prediction.

In a similar fashion, the preferred embodiment enables a designer to reorient a selected antenna in real-time with respect to any coordinate axis while the graphical display of all drawing watch points is updated to reflect the revised wireless system performance metrics as a result of the new antenna orientation.

In a similar fashion, a designer may replace an existing hardware component in the wireless communication system with any component available from the parts list library. In doing so, the changes to the wireless communication system performance as a result of the replacement is reflected in the graphical display of the watch points.

In a similar fashion, a designer may selectively include or exclude any subset of components within the wireless communication system while selecting components to involve in the wireless system performance calculation. For example, a designer could consider the effect of repositioning a single antenna, or could consider the combined, composite effect on the watch points as individual antennas are repositioned within a wireless system network consisting of additional, fixed antenna placements.

In a similar fashion, the designer may choose to allow watch points to be mobile. That is, instead of positioning a watch point and having the graphical display of the watch point reflect the changing wireless system performance metric, the designer could instead identify a watch point whose position is mobile but whose graphical display remains constant. In this scenario, the position of the watch point fluctuates along a linear path traced between itself and the current location of the mouse cursor until a position within the 3-D database is found at which the desired level of wireless system performance metric is maintained. For example, the designer may create a watch point to maintain a constant graphical display synonymous with −65 dBm RSSI. As the user repositions, reorients, or otherwise alters components within the wireless communication system, the watch point alters its position within the 3-D environmental database until a position is found at which a calculated value of −65 dBm RSSI is determined.

In addition to enabling a designer to reposition, reorient, and/or replace wireless system components in real-time while visualizing the impact of such changes at selected watch points within the 3-D database, the user may choose to maintain the current configuration of the wireless communication system and instead create a single, mobile watch point. The watch point thus created is dynamically repositioned within the 3-D environmental database in real-time by the user by simply repositioning the mouse cursor. Positioning the mouse cursor at a given location within the 3-D environmental database is equivalent to repositioning the watch point to match that location. In the present invention, this technique is used to allow the mobile watch point to represent a mobile user in the 3-D environmental database. As in the previous scenarios, the graphical display of the watch point is updated in real-time to reflect predicted wireless system performance metrics at the watch point position. The designer is free to select individual subsets of wireless system components to involve in the calculations of wireless system performance. Thus the graphical display of the watch point may reflect the performance metrics specific to individual wireless system components or the composite performance metrics due to the combined effect of multiple selected components. For example, the radiating power of multiple antennas can be combined into a single measure of received signal strength.

The two primary uses of the single mobile watch point technique involve the analysis of the forward link (or down link) and reverse link (or up link) of the wireless system. The forward link of a wireless communication system involves the flow of radio signals from the fixed wireless system to the mobile user, while the reverse link of a wireless communication system involves the flow of radio signals from the mobile user to the fixed wireless system. In the present embodiment, line segments are drawn between the mobile watch point (which is also the mouse cursor) to each antenna the designer has included in the wireless system performance prediction. In addition, the individual or subsets of antennas identified as having the best wireless system performance characteristics are differentiated from the other antennas by altering the color and/or other physical appearance of the connector lines between the antennas and the watch point. As the designer then repositions the mouse cursor, the selected location for the watch point in the 3-D database, and therefore the effective location of the mobile user, is adjusted to match that of the mouse cursor. The wireless system performance metrics are recalculated at the watch point location for the antenna components selected by the designer, and the graphical display of the watch point and all connector lines is updated accordingly.

Another improvement over the prior art is the ability to dynamically model the repositioning of leaky feeder antennas and visualize the effects on wireless system performance. A leaky feeder antenna can be thought of as a cable with many holes regularly spaced along its length. Such a cable would experience a signal loss or emanation at every hole and would thus radiate RF energy along the entire cable length. Leaky feeder antenna, or lossy coaxial cable as it is sometimes referred, can be thought of as analogous to a soaker hose where water flows in at the head of the hose and leaks out through a series of holes. The present method allows the designer to dynamically re-position a portion of the leaky feeder antenna and see in real time the effects on wireless system performance at the specified watch points. In the preferred embodiment, distributed antenna systems can be analyzed in terms of the contributions of individual antennas or collections of antennas taken as a whole, providing "composite" results in the latter case.

Figure 5:
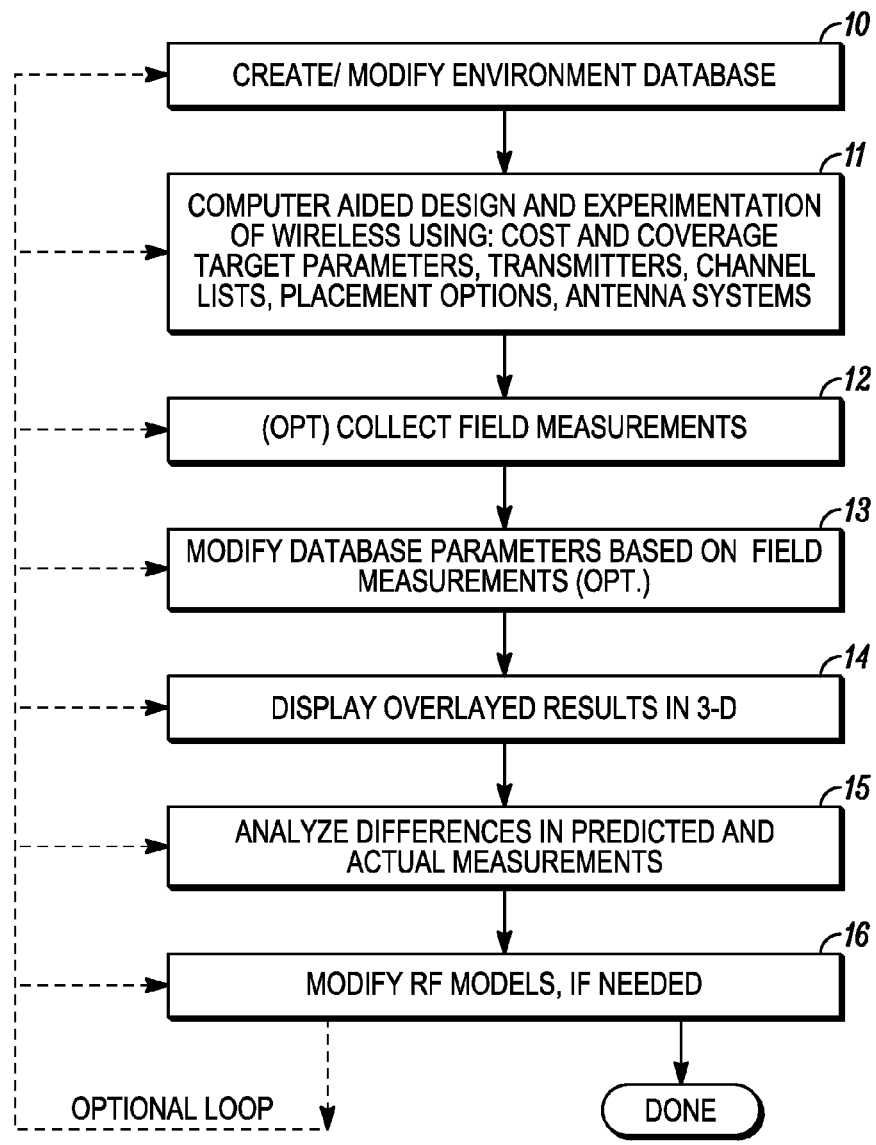
FIG. 5 is a flow diagram of a general method used to design a wireless communication network.

Referring to FIG. 5, there is shown the general method of the invention. Before one can run an automated predictive model on a desired environment, a 3-D electronic representation of that environment must be created in function block 10. The preferred method for generating a 3-D building or environment database is disclosed in application Ser. No. 09/318,841, now U.S. Pat. No. 6,850,946. The resulting definition utilizes a specially formatted vector database format and comprises lines and polygons rather than individual pixels (as in a raster format). The arrangement of lines and polygons in the database corresponds to obstructions/partitions in the environment. For example, a line in a database could represent a wall, a door, tree, a building wall, or some other obstruction/partition in the modeled environment.

From the standpoint of radio wave propagation, each of the obstruction/partition in an environment has several electromagnetic properties. When a radio wave signal intersects a physical surface, several things occur. A certain percentage of the radio wave reflects off of the surface and continues along an altered trajectory. A certain percentage of the radio wave penetrates through or is absorbed by the surface and continues along its course. A certain percentage of the radio wave is scattered upon striking the surface. The electromagnetic properties given to the obstruction/partitions define this interaction. Each obstruction/partitions has parameters that include an attenuation factor, surface roughness, and reflectivity. The attenuation factor determines the amount of power a radio signal loses upon striking a given obstruction. The reflectivity determines the amount of the radio signal that is reflected from the obstruction. The surface roughness provides information used to determine how much of the radio signal is scattered and/or dissipated upon striking an obstruction of the given type.

Once this 3-D database of obstruction data has been built, the design engineer performs computer aided design and experimentation of a wireless network to be deployed in the modeled environment in function block 11, to be described later. Cost and wireless system performance target parameters, transmitters, channel lists, placement options and antenna systems are all taken into account by the present invention.

In order to fine tune the experimental predictions, RF measurements may be optionally taken in function block 12. If necessary, database parameters that define the partition/obstruction characteristics may be modified using RF measurements as a guide to more accurately represent the modeled 3-D environment in function block 13.

The results of the predictive models may be displayed in 3-D overlaid with the RF measurement data, if any, at any time in function block 14. The design engineer analyzes the differences in the predicted and actual measurements in function block 15, and then modifies the RF predictive models, if needed, in function block 16. If necessary, the 3-D environment database may be modified based on the actual measurements to more accurately represent the wireless system coverage areas in function block 10, and so on iteratively until done. The designer can optionally continue with any other step in this process, as desired.

Figure 6:
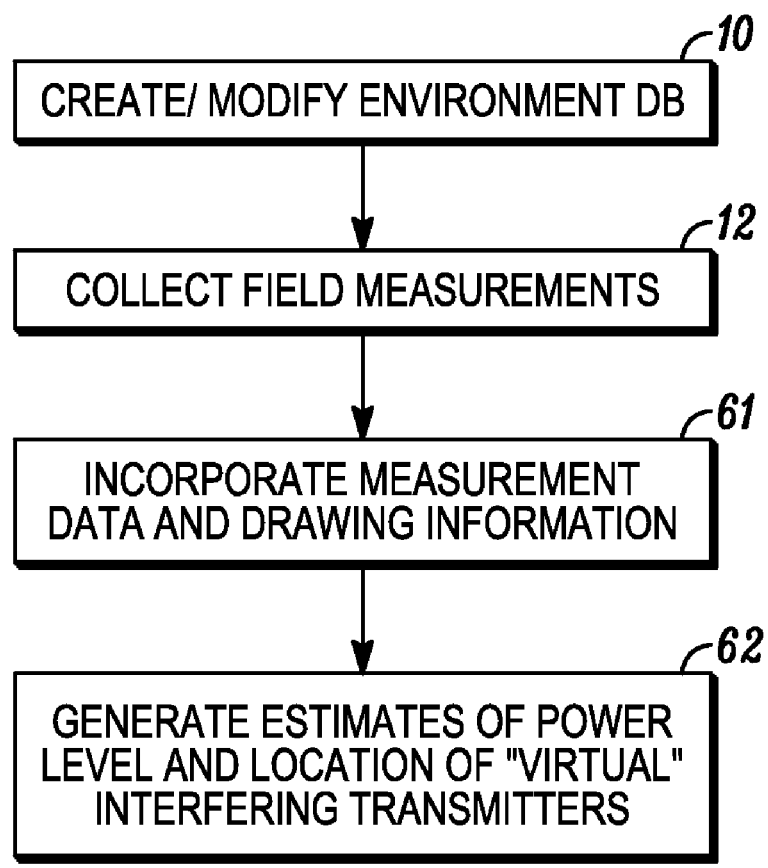
FIG. 6 is a flow diagram of a method used to generate estimates based on field measurements.

The method of invention may be used in a variety of ways depending on the goals of the design engineer. FIG. 6 shows a variant on the above method used to generate estimates based on RF measurements. A 3-D database of the environment must still be generated in function block 10. Field measurements are collected in function block 12. The RF measurement data are then incorporated into the drawing of the environment in function block 61. The design engineer may then generate estimates of power level and location of potential transmitters in function block 62.

Figure 7:
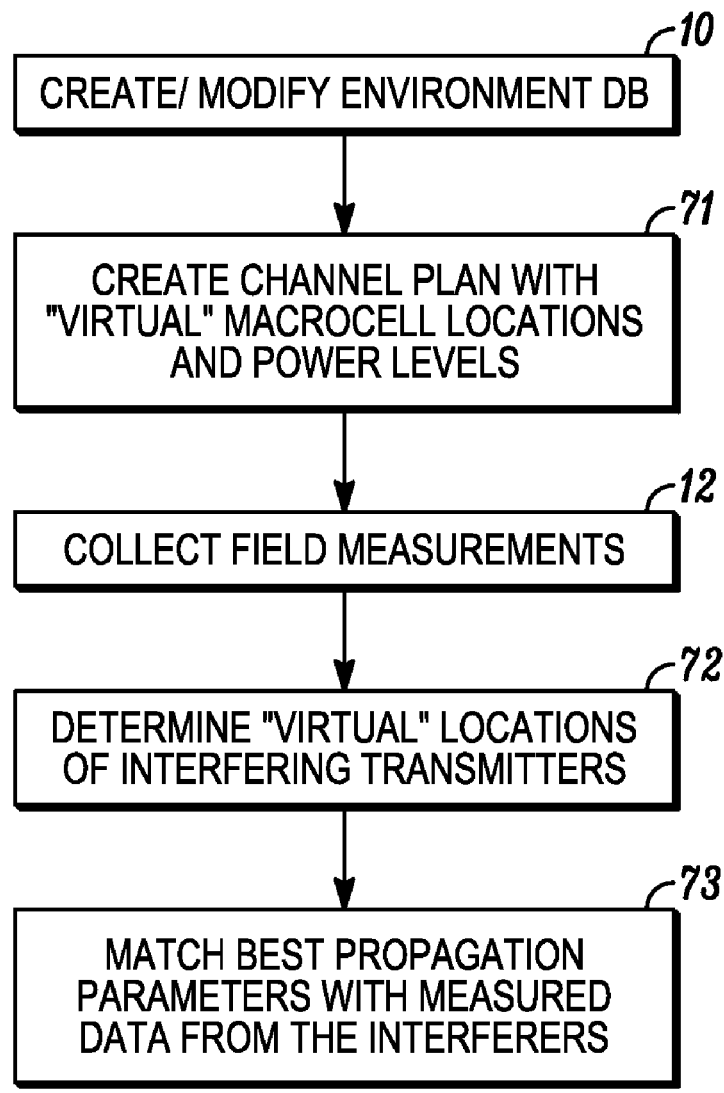
FIG. 7 is a flow diagram of a method used to match best propagation parameters with measured data.

FIG. 7 shows a variant of the method used to achieve optimal prediction accuracy using RF measured data. Once again, a 3-D database of the environment is generated in function block 10. However, before collecting field measurements, the design engineer creates a channel plan with "virtual" macrocell locations and power levels in function block 71. The field measurements are then collected in function block 12 and the "virtual" locations of interfering transmitters can be determined in function block 72. The best propagation parameters are then matched with measured data from the interferers in function block 73.

Figure 8:
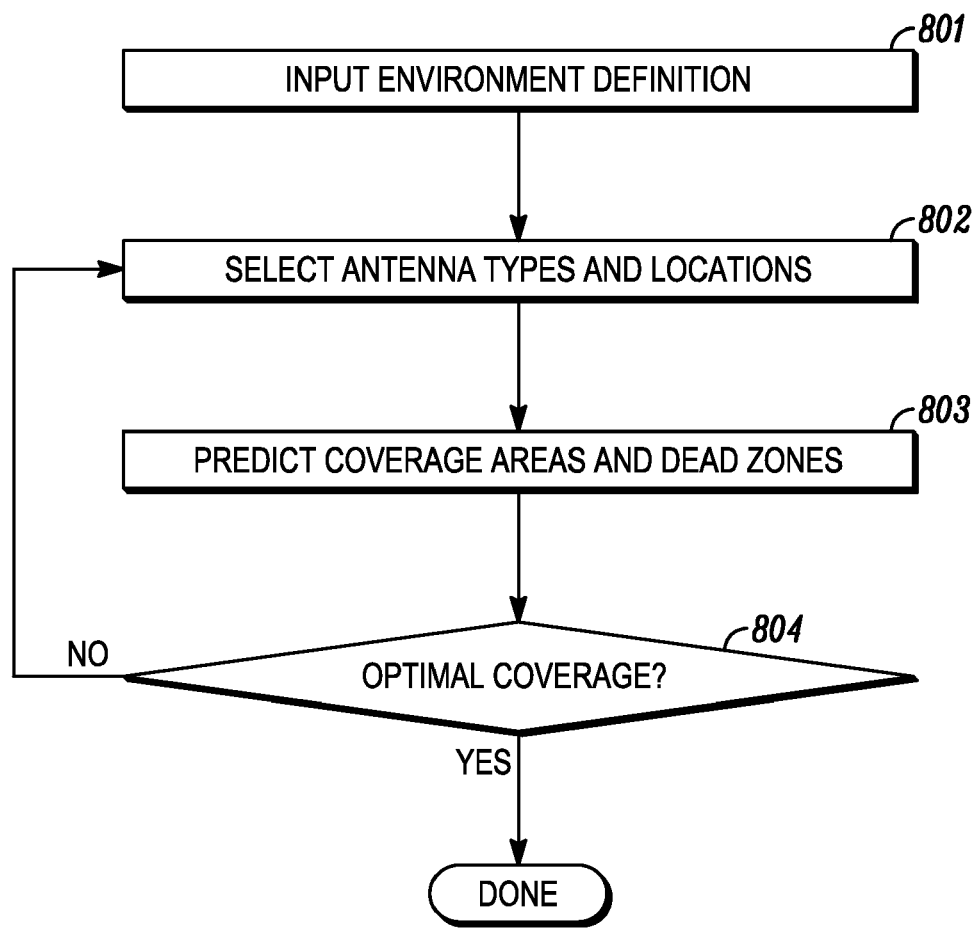
FIG. 8 is a flow diagram of a method for prediction.

A more detailed description of the method for prediction used in the present invention is now described. Referring to FIG. 8, the 3-D environment definition is input in function block 801. The first step required before predicting the performance of the wireless communication system is to model the wireless system with the 3-D environment. Antennas and types of related components and locations are selected in function block 802. The desired antennas are chosen from a parts list of wireless hardware devices that may include a variety of commercially available devices. Each antenna is placed at a desired location within the environment, for instance, in a specific room on a floor of a building or on a flag pole in front of a building. A number of other components may be created and placed either within or connected to each antenna system. These components include, but are not limited to: cables, leaky feeder antennas, splitters, connectors, amplifiers, or any other user defined component.

Figure 9A:
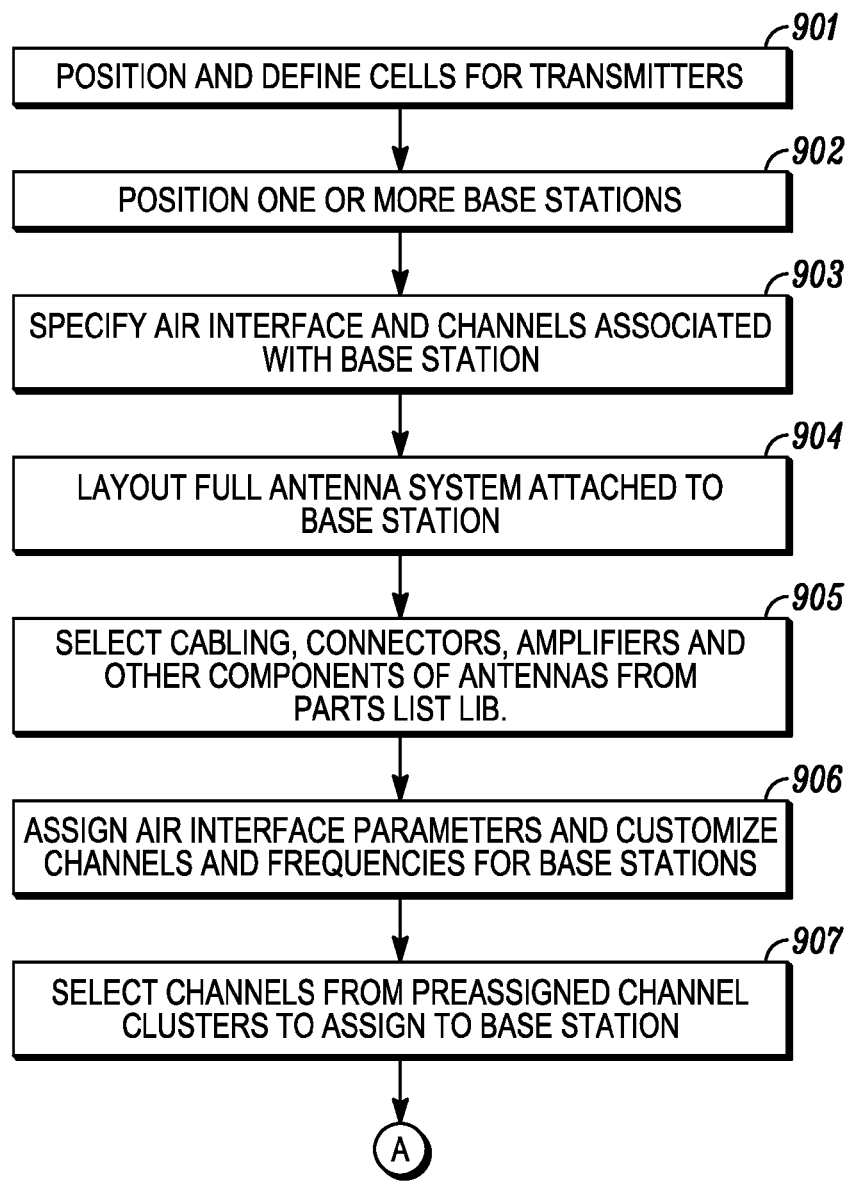
FIGS. 9A and 9B together make up a detailed flow diagram of a method to generate a design of a wireless network and determine its adequacy.
Figure 9B:
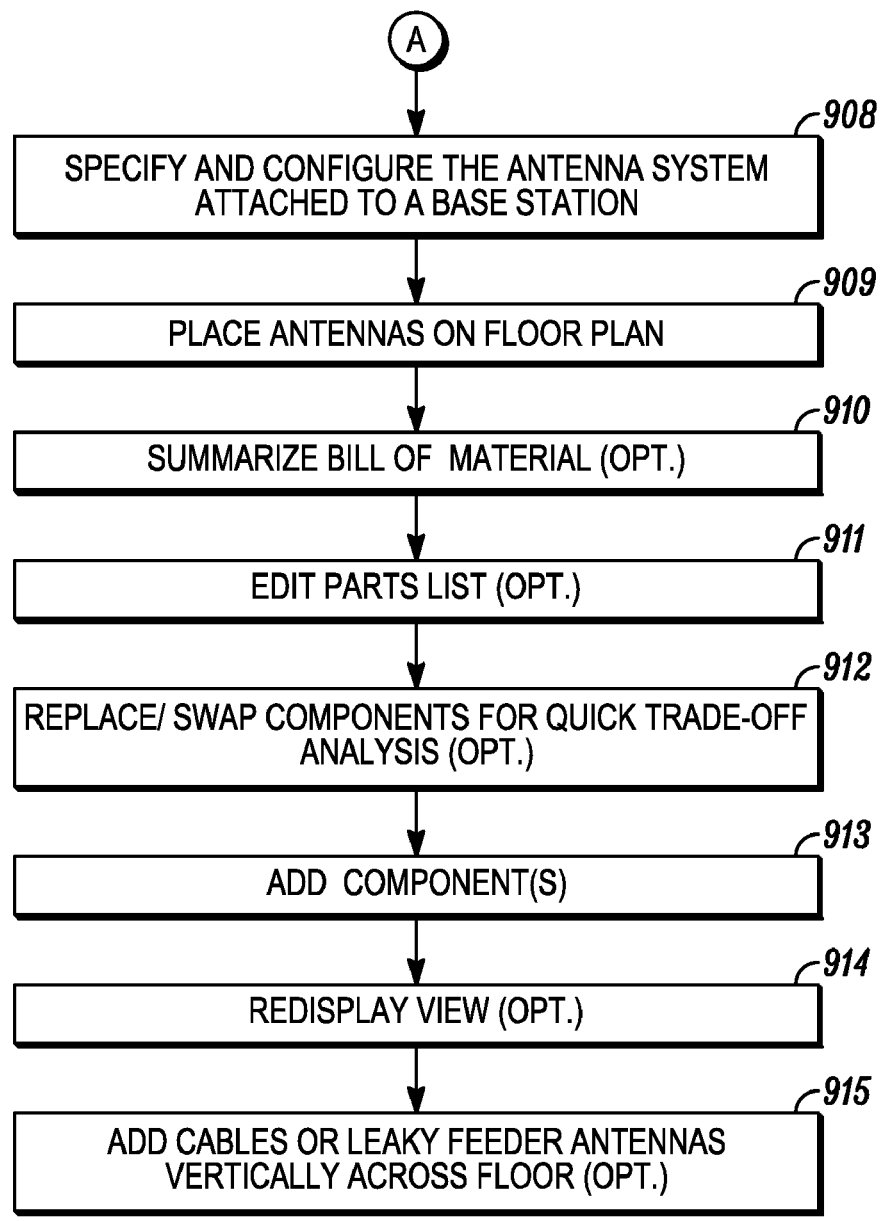

FIGS. 9A and 9B show a method for adding antenna systems to a desired environment and generally for running trade-off analyses. First, the designer positions and defines outdoor wireless communication systems, if necessary in function block 901. Next, the designer positions and defines indoor base stations in function block 902. The methods of function blocks 901 and 902 differ in that the components of indoor wireless system will typically be different than an outdoor wireless system. In both cases, the designer is guided through a series of pull down menus and point-and-click options to define the location, type of hardware components and associated performance characteristics of the antenna systems. This data is stored in a database, that also contains cost and manufacturing specific information to produce a complete Bill of Materials list automatically, to be viewed at any time.

In order to fully describe an antenna system in a newly created (or to be modified) wireless system, the designer specifies the air interface/technology and frequencies associated with the wireless system in function block 903. The designer then lays out the full antenna system for the wireless network in function block 904. Components such as base stations, cabling, connectors, amplifiers and other items of the antenna system are then selected from a parts list library containing information on commercially available hardware components in function block 905. Next, the air interface and technology specific parameters are assigned and channel frequencies are customized for the wireless system in function block 906. The channel frequencies are selected from pre-assigned channel clusters and assigned to the wireless system in function block 907. An antenna system is then configured in function block 908, selecting antennas from the parts list library as described above. The antennas are placed on the floor plan in function block 909 using a point and click of a mouse or other positioning device to visually place each component in the 3-D database.

At this or any time after a component has been placed on a floor, the designer may view a bill of materials in function block 910. If necessary, the parts list may be modified to add or delete components or modify a component's cost or performance characteristics in function block 911. Components may be replaced or swapped for similar components for a quick trade-off analysis of both wireless system performance and overall cost in function block 912. Components may be added, deleted or modified to more fully define the wireless communications system in function block 913. The designer may redisplay the view of the environment including the wireless communication system, RF measurement data, and/or wireless system predicted performance results in a variety of forms, including 2-D, 3-D wireframe, 3-D wireframe with hidden lines, 3-D shaded, 3-D rendered or 3-D photorealistic rendering, at any time in function block 914.

Typically, a designer will add wireless system components in succession, where each newly placed system component connects to a previously positioned component in the wireless network. One should note that cables and leaky feeder antennas are defined by a series of vertices connected by lines representing lengths of cabling as they are placed on a floor. Cables and leaky feeders may also stretch vertically across building floors, down the sides of buildings, through elevator shafts, etc., simply by adding a vertex in the cable, changing the vertical height, and then continuing to place cable in new locations, in function block 915. The designer does not need to manipulate a 3-D view of the environment and attempt to guide the cables vertically in the 3-D model. The designer may repeat any of the steps in this process, in any order, in the present invention.

Referring again to FIG. 8, once the 3-D environment has been defined and antennas, cables and other objects have been selected and located, the wireless system performance prediction models may be run in function block 803. A variety of different such models are available and may be used in succession, or alone to generate a sufficient number of "what-if" scenarios for predicting and optimizing of antenna placements and component selections.

Figure 10:
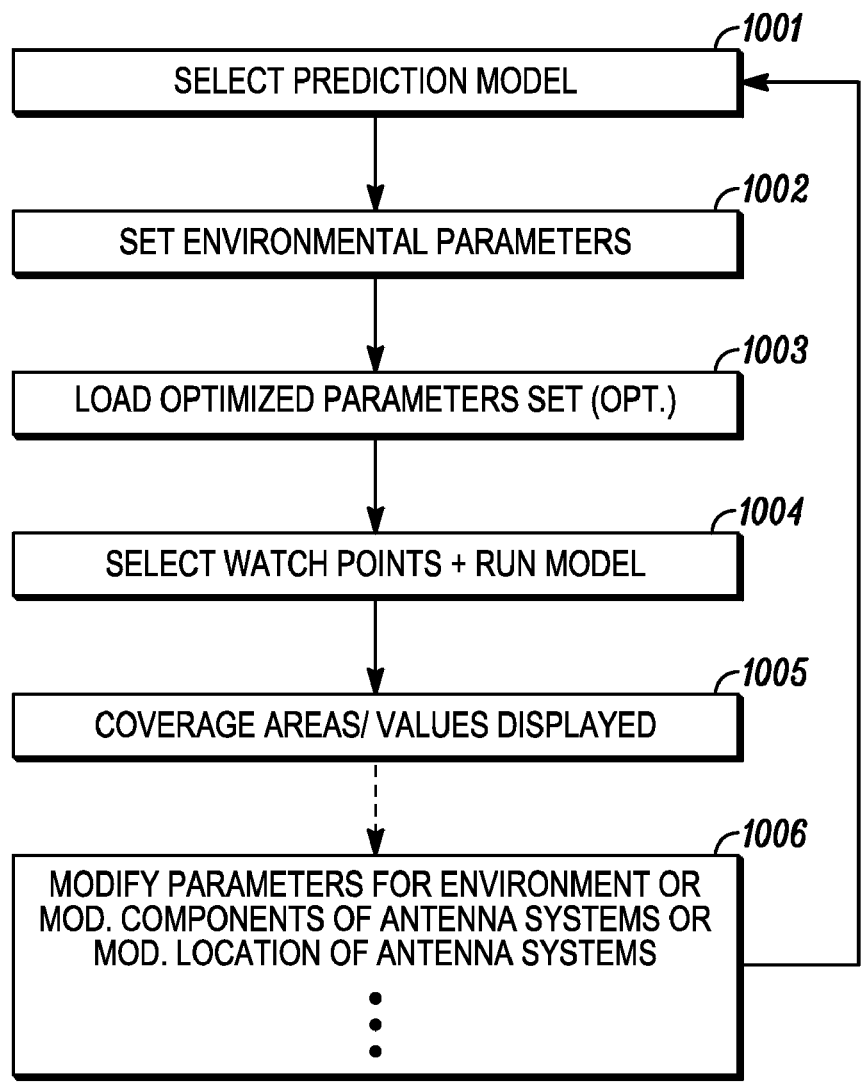
FIG. 10 is a flow diagram showing a method for using watch points during antenna repositioning or modification.

Referring to FIG. 10, a method for predictive modeling according the invention is shown. First, the designer selects the desired wireless system performance prediction model in function block 1001. Preferred models are:
  Wall/floor Attenuation Factor, Multiple Path Loss Exponent Model,
  Wall/floor Attenuation Factor, Single Path Loss Exponent Model,
  True Point-to-Point Multiple Path Loss Exponent Model,
  True Point-to-Point Single Path Loss Exponent Model,
  Distance Dependent Multiple Breakpoint Model,
  Distance Dependent Multiple Path Loss Exponent Model,
  Distance Dependent Single Path Loss Exponent Model, or
  other models as desired by the design engineer.

The physical and electrical properties of obstructions in the 3-D environment are set in function block 1002. Although not all parameters are used for every possible predictive model, one skilled in the art would understand which parameters are necessary for a selected model. Parameters that may be entered include:
  Prediction configuration—RSSI, C/I, and/or C/N (carrier to noise ratio);
  Mobile Receiver (RX) Parameters—power, antenna gain, body loss, portable RX noise figure, portable RX height above floor;
  Propagation parameters—
  Partition Attenuation Factors
  Floor Attenuation Factors
  Path Loss Exponents
  Multiple Breakpoints
  Reflectivity
  Surface Roughness
  Antenna Polarization
  other parameters as necessary for a given model The designer may save sets of physical, electrical and aesthetic parameters for later re-use. If such a parameter set has been previously saved, the designer may load that set in function block 1003, thereby overwriting any parameters already in selected.

Figure 11:
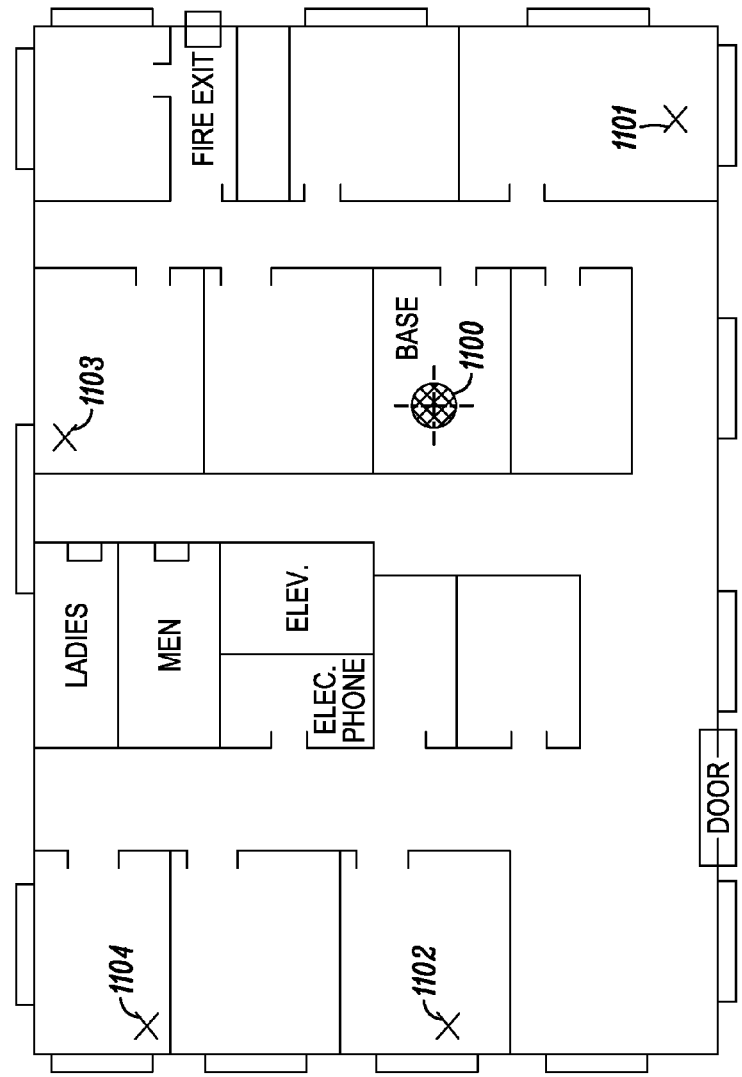
FIG. 11 shows a simplified layout of a floor plan of a building with a base station and watch points selected.

A designer then may select a number of watch points in function block 1004 to monitor for wireless system performance. Referring now to FIG. 11, there is shown a simplified layout of a floor plan with a base station 1100. The designer may use a mouse or other positioning device to point and click to any number of locations in the floor plan to select critical areas, or watch points, for monitoring. Here, for instance, four watch points 1101, 1102, 1103 and 1104 have been selected.

Figure 12:
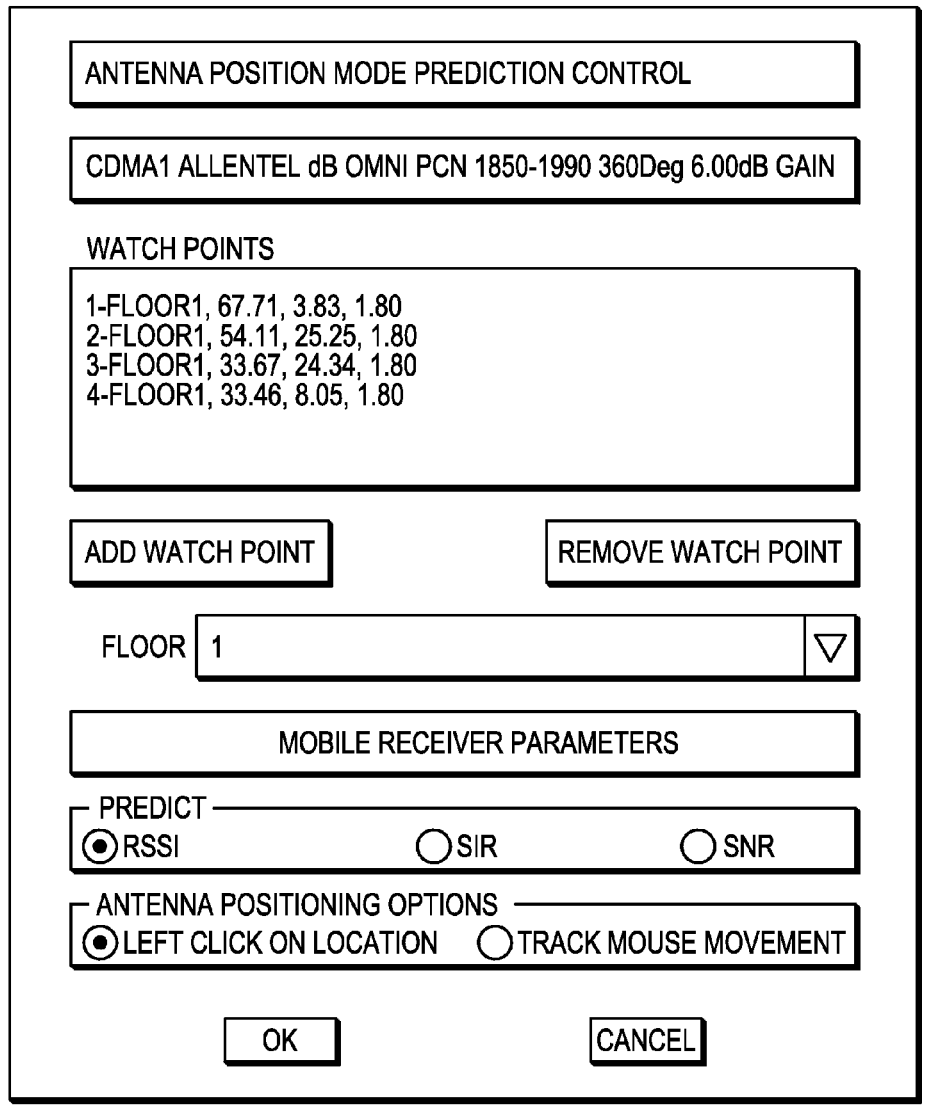
FIG. 12 shows a dialog box displaying the locations of the selected watch points and choices for display information.

FIG. 12 shows a display, that lists by location, watch points selected for the current prediction. The designer may then select predictions for RSSI, signal to interference ratio (SIR) or signal to noise ratio (SNR). In addition, the designer can see changes in predicted values for each watch point in real time as the mouse is moved, or can choose to select new antenna positions specifically by clicking on a new location. As the designer repositions the mouse cursor, the antenna(s) selected prior to initiating the prediction are effectually repositioned and/or relocated according to position of the cursor. Once all watch points are selected, the prediction model is run. An alternative embodiment is that watch points could be entered and modified on the fly, as the prediction model is being run, rather than defined only prior to running the model. Another alternative embodiment is that RF values at the watch points are updated continuously as the mouse is repositioned, without a click being necessary.

Figure 13:
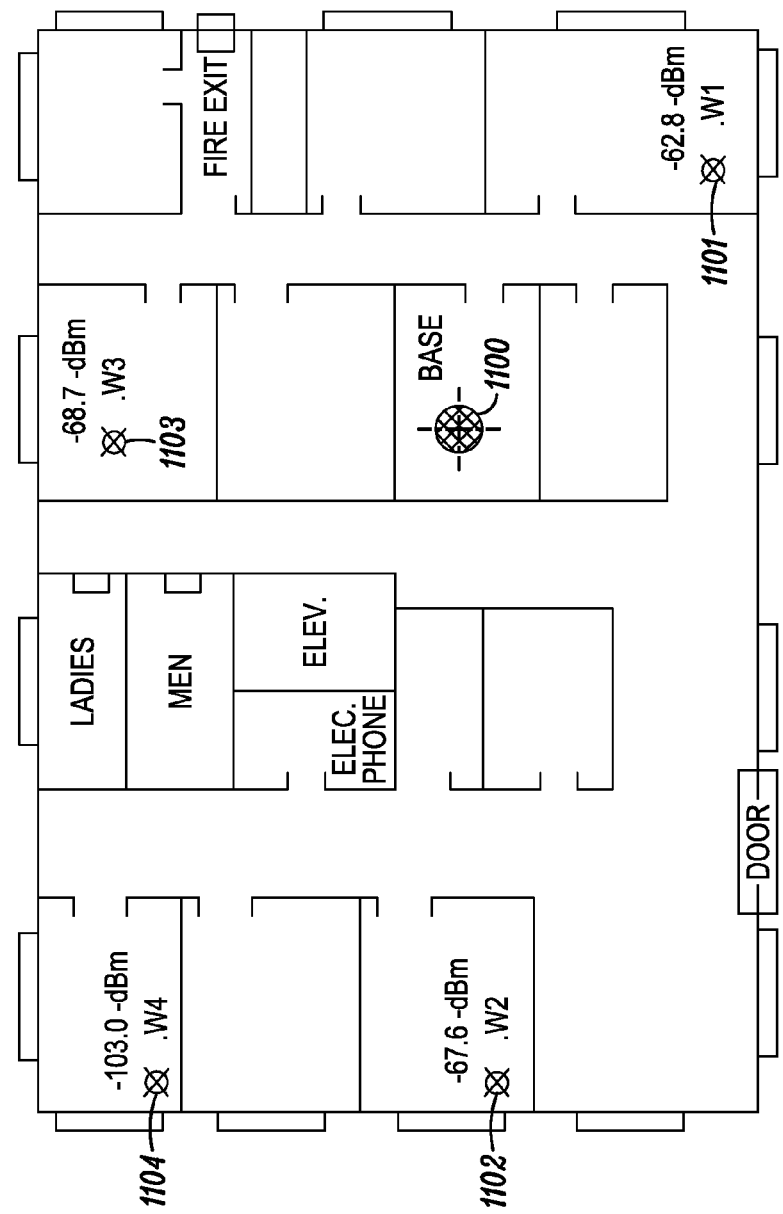
FIG. 13 shows a simplified layout of a floor plan of a building with a base station and initial RSSI values for the selected watch points.
Figure 14:
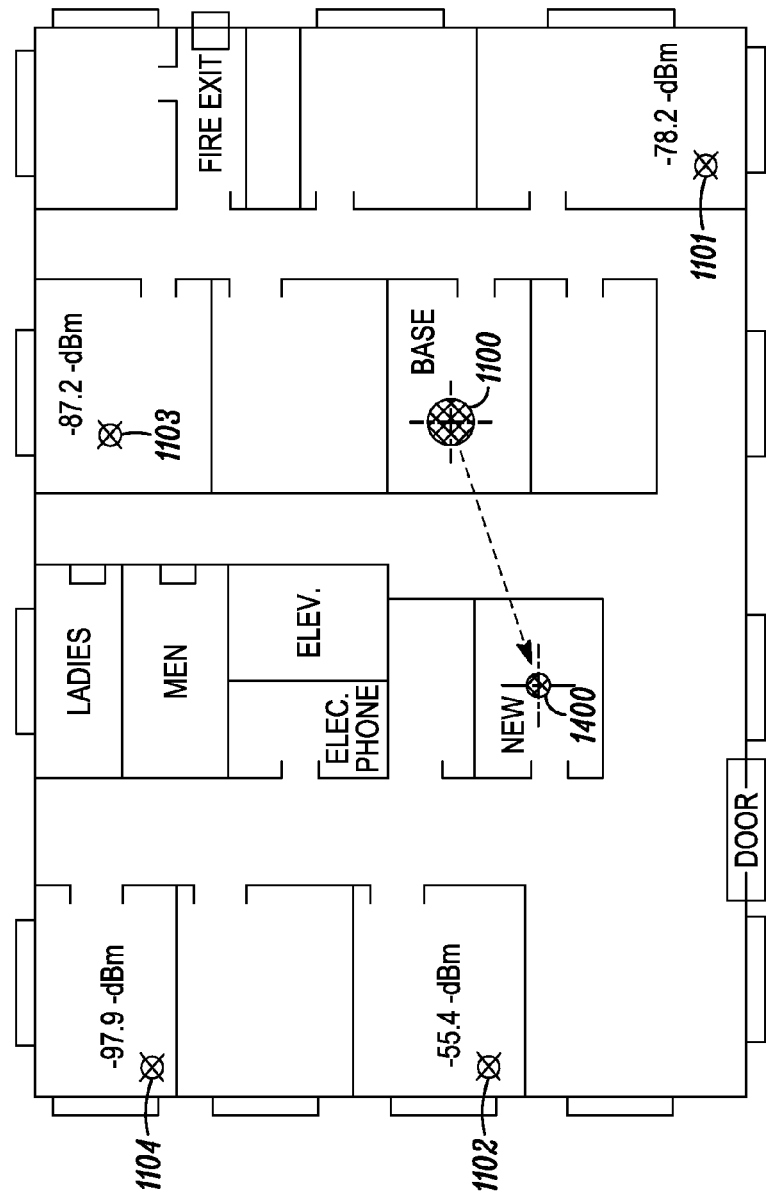
FIG. 14 shows a simplified layout of a floor plan of a building with a repositioned base station and changed RSSI values for the selected watch points.
Figure 15:
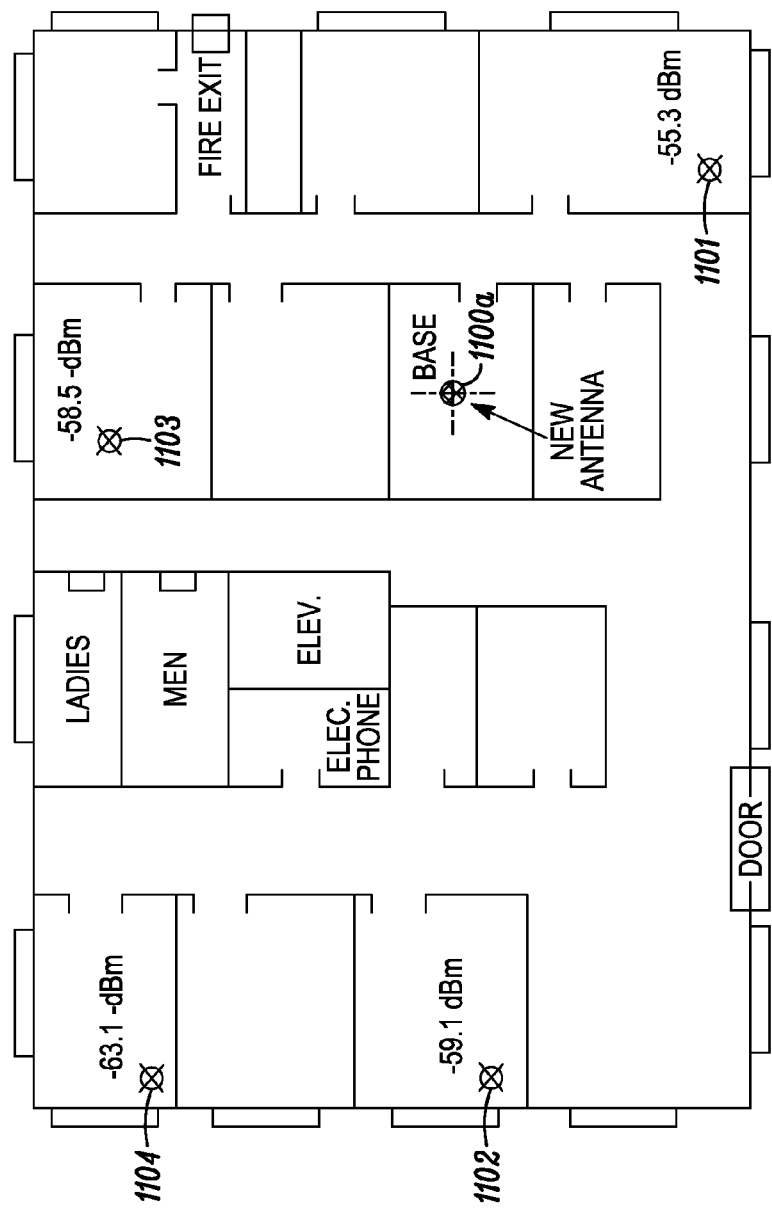
FIG. 15 shows a simplified layout of a floor plan of a building with a re-engineered base station and changed RSSI values for the selected watch points.

FIG. 13 shows the floor plan of FIG. 11 with the initial RSSI values for each watch point 1101, 1102, 1103 and 1104 also shown. The designer may move the antenna 1100 to a new location and monitor the same watch points for coverage. FIG. 14 shows the floor plan of FIGS. 11 and 13 with the antenna 1100 moved to a new location 1400. The RSSI values at each watch point 1101, 1102, 1103, and 1104 are automatically updated with values associated with the new location of the antenna. Alternatively, the designer may choose to modify the components within the antenna system 1100 for performance or cost reasons. FIG. 15 shows the floor plan of FIGS. 11 and 13 with a base station 1100a at the same location, but with a higher performance antenna component. The RSSI values at each watch point 1101, 1102, 1103, and 1104 are again automatically updated with values associated with the new wireless system performance parameters.

Referring again to FIG. 10, for RF coverage models, the coverage areas and values are displayed in function block 1005. If so desired, the designer modifies the electrical parameters of the obstructions, or modified components of antenna systems, or modifies antenna system locations or orientation, etc. in function block 1006 before running another prediction model in function block 1001.

Referring again to FIG. 8, after running a number of models, the design engineer may determine that RF coverage is optimal in decision block 804. If so, then depending on the results either a change in the location of antenna(s) and components will be desired or possibly just a substitution of components without a location change. For instance, even though the coverage may be more than adequate, the total cost of the wireless system could be prohibitive. A method for optimizing the costs using a dynamic, real time, bill of materials management system is disclosed below. Regardless, if the wireless network as currently modeled is not deemed optimal, then the method would continue again in function block 802 to re-select the components.

Once the design is as desired, then the 3-D database holds all of information necessary to procure the necessary components in the Bill of Materials. The locations of each component are clearly displayed, and a visual 3-D representation can be viewed as a guide.

Once the wireless system design is as desired, the database holds all of information necessary to procure the necessary components in the Bill of Materials. The locations of each component are clearly shown, overlaid with the physical environment, and a visual 3-D representation can be viewed as a guide.

Generating and Managing a Bill of Materials

As described above, in more detail, the invention uses 3-D computer aided design (CAD) renditions of a building, collection of buildings, or any other such environment that contains information suitable for the prediction of a wireless system performance. Estimated partition electrical properties can be extracted from radio frequency measurements already published, and/or specified by the designer at any time. Once the appropriate electrical properties are specified, an unlimited number of RF sources can be placed in the 3-D database, and received signal strengths intensity (RSSI) or carrier-to-interference (C/I) ratios can be plotted directly onto the CAD drawing.

The 3-D environment database could be built by a number of methods, the preferred method being disclosed in application Ser. No. 09/318,841, now U.S. Pat. No. 6,850,946. Traffic capacity analysis, frequency planning, Co-channel or adjacent channel interference analysis can be performed concurrently with the prediction of RSSI, C/I and other wireless system performance measures. The antenna system and bill of materials could be built by a number of methods. The preferred method for building the antenna system is described above.

As the designer builds a model of a wireless communications system in a specified environment, as described above, a full bill of materials is maintained for every drawing in the environment. That is, each drawing may contain its own unique set and arrangement of antennas, feed systems and related components representing a variation in the design of a wireless communication system. These components are drawn from a global parts list library. A number of methods could be used to generate the global parts list library, and it would be apparent to one skilled in the art that varying formats could be used.

In the present invention, the design engineer selects a specific wireless system hardware component from the parts list library using pull-down menus and displayed dialog windows. The selection criteria for a particular component is wireless system design dependent, but generally involves the desirability of a component based upon its electrical characteristics and potential effect on wireless system performance, material cost, and/or installation cost. The present invention enables the designer to narrow the focus of component selection to only those devices contained within the parts list library that have the desired characteristics. For example, the design engineer may choose to design a wireless system using components from a specific manufacturer or set of manufacturers that have a desirable material cost and/or electrical characteristics. In doing so, only those devices that meet the requested criteria are displayed for selection from dialog windows in the present invention.

Once a desired component is selected by pointing and clicking with a mouse or other input device, the design engineer may position the component within the three dimension environmental database. This process involves the design engineer using the mouse or other input device to visually identify the desired location for the component by clicking (or otherwise identifying) positions within the 3-D environmental database. For example, an antenna component could be placed within a specific room of a building, atop a flag pole on the side of a building, in the center of a park, or any other location deemed reasonable by the designer. In similar fashion, hardware components that span distances (e.g. coaxial cable, fiber optic cable, leaky feeder antenna, or any component having substantial length) are selected and positioned within the 3-D environment by clicking with the mouse or other input device to identify the vertices (or end points) of the component where each pair of vertices are connected by a time segment representing a portion of cable. Thus, while certain components, such as point antennas or splitters, for example, require only a single point in the 3-D environment to identify placement in the wireless communication system, other components such as distribution cables or distribution antennas require the identification of multiple points joined by line segments to identify placement. In the present invention, unique graphic symbols are utilized to represent each wireless system component and overlaid onto the three-dimensional environmental database enabling the designer to visualize the wireless communication system as it would exist in the physical world. As an example of the graphical display and shown only in two dimensions for convenience, FIG. 4 displays a base station 107 connected via two coaxial cables 402 to two indoor point antennas 403*a* and 403*b*.

The present embodiment of the invention provides and links information relating to wireless system component dependence. Such dependencies may include but are not limited to impedance matching of adjoining components, maximum run length, and/or proper termination. Certain components in the parts list library may require pre-existing components to have been positioned within the 3-D environmental database before they themselves may be selected and added to the wireless system. For example, a splitter or other device designed to interconnect two or more independent components may require that an existing component be present in the three dimensional database for the splitter to be connected with. In the previous embodiment of the invention, if the designer chooses to place a hardware component within the 3-D environmental database, and the desired component is dependent upon some other device currently placed in the 3-D database, the designer is prompted through a selection window to identify the dependent component and the selected component is positioned accordingly. In the previous example of the splitter component, if the designer chooses to connect the splitter onto the end of an existing cable component by identifying the cable component with the mouse or other input device, the position of the splitter within the three-dimensional database is automatically assigned to be the end of the identified cable. Wireless system components that do not have such dependencies (e.g., base station transceivers) may be freely positioned anywhere within the 3-D environmental database that is deemed suitable by the designer. As this description is specific to one particular implementation, one skilled in the art could see how different implementations could be developed and practiced within the scope of this document.

Using the preferred embodiment of the invention, a designer can model and represent, visually as well as mathematically, complex wireless communication systems involving any number of individual hardware components selected from the parts list library, interconnected with and linked to one another to form complete antenna systems. As each component has associated characteristics regarding electrical properties (e.g. gain, noise figure, attenuation) and cost, the addition, removal, or change of any component directly impacts both the performance of the wireless system and the overall system cost. With the preferred embodiment of the invention, this information is updated in real-time as the designer makes changes to the wireless system. If a wireless communication system includes a specific hardware component, the present invention retrieves the associated electromechanical characteristics and other pertinent information from the parts list library entry that has been specified for the component. This information is stored in a database and is then used to quantify the effect that the component has on various aspects of wireless system design parameters or performance. For example, if the parts list library information for a specific cable indicates that the attenuation loss of the cable is 3.5 dB per 100 meters, and the designer has added a 200 meter segment of the cable to the wireless communication system, the present invention combines the information regarding the placement and length of the cable in the 3-D environmental database with the attenuation loss information from the parts list library to determine a total attenuation loss of 7 dB for the cable. Furthermore, the noise figure and other related qualities of the cable is also computed based upon well known communication theory. If the designer then adds an amplifier to the wireless system and connects it onto the end of the cable as described above, the invention retrieves information regarding the amplifier from the parts list library to determine overall gain of the wireless distribution system. If, for instance, the selected amplifier has an associated gain of 10 dB and some specified noise figure, the present invention combines the characteristics of the interconnected cable and amplifier to determine a total gain of 3 dB for the combined components, and a new system noise figure. If the designer edits or alters component information in the parts list library, this is automatically reflected in the wireless system performance prediction. For example, if the amplifier in the example above has the gain associated with it edited in the parts list library and changed from 10 dB to 15 dB, the combined system characteristics, which may include but are not limited to system gain and system noise figure, of the cable and amplifier from the example are automatically recalculated, resulting in an overall gain of 8 dB instead of 3 dB. Similarly if the cable is repositioned such that its overall length is altered or replaced with a different component from the parts list library, the effect of doing so is automatically recalculated an reflected in all future operations. Although the given example is in terms of simple gains and losses of the individual wireless components, one skilled in the art could apply this same method to any other electrical, electromechanical, financial, aesthetic or other quality associated with components in the parts list library and the overall system in a similar fashion.

A preferred Parts List Library is designed to be generic and applicable to any type of wireless communication system component or wireless communication system design methodology. There are eight basic categories of components in the preferred parts list library utilized in the preferred embodiment, although more categories could be added, as desired:

1. Amplifiers/Attenuators—generally speaking, devices that either boost or decrease the strength of radio wave signals;

2. Connectors/Splitters—generally speaking, devices that connect one or more components to one or more additional components;

3. Cables—various types of cabling (e.g., fiber optic cable, coaxial cable, twisted pair cable, etc);

4. Manufacturer-Specified Point Antennas—any antenna that is manufactured and whose manufacturer has supplied information with regard to the radiation pattern of the antenna. The radiation pattern of an antenna describes the manner in which radio signals are radiated by the antenna. Antenna manufacturers supply radiation pattern information regarding their antennas so that wireless system designers can maximize the effectiveness of antenna deployments;

5. Generic Point Antennas—any generic or idealistic antenna (that is, an antenna that may not be physically realizable or has a generic radiation pattern);

6. Leaky Feeder Cabling/Antennas—a type of antenna that takes the form of a specialized coaxial cable;

7. Base Station/Repeater—the controlling portion of the wireless communication system. The base station manages all communication taking place in the wireless network; and 8. Other—Any component that does not belong in one of the above categories.

Each component has a variety of associated values. These include, but are not limited to:
Manufacturer Name;
Manufacturer Part Number;
User-supplied Description;
Frequency range at which part has been tested;
Attenuation/Amplification;
Number of Connections;
Physical Cost (material cost of component);
Installation Cost; and
Antenna Radiation Pattern.

Base stations and repeater components have a number of additional parameters associated with them, including, but not limited to:
Technology/Air Interface—identifies the wireless technology employed by the base station (e.g., AMPS ("analog cellular"), IS-136 ("digital cellular"), IEEE 802.11 ("wireless LAN"), etc.);
Frequency/Channel Assignments—identifies the radio frequencies/channels this base station can utilize; and
Transmit Power—the amount of power the base station is broadcasting.

An excerpt from the preferred embodiment of a parts list, with identifying line numbers not actually in the database, is shown below.

1: KEY|ITEM|TYPE|MANUFACTURER|PART #|FREQUENCY (MHZ)|dB LOSS/GAIN (per 100 m if CABLE) |CONNECTIONS|COST (US$)|DESCRIPTOR FILE

2: 0|GENERIC FEED LINE|CABLE|GENERIC|N/A|900|2|2|0|N/A

3: 1|GENERIC CONNECTOR|CONNECTOR|GENERIC|N/A|900|1|2|0|N/A

4: 2|GENERIC SPLITTER|CONNECTOR|GENERIC|N/A|900|2|3|0|N/A

5: 3|GENERIC 10 dB AMPLIFIER|AMPLIFIER|GENERIC|N/A|900|10|2|0|N/A

6: 4|GENERIC LEAKY FEEDER|ANTENNA_LEAKY|GENERIC|N/A|1900|4|2|0|N/A

Line 1 is a header line indicating the titles of fields delimited by a pipe, or "|", character. The first field is the "KEY" field;

the second field is the "ITEM" field; the third field is the "TYPE" field; and so on. The next to last field is the cost in U.S. dollars. Lines 2 through 6 show five records of data in the parts list for the following components:

Generic feed line,
Generic connector,
Generic splitter,
Generic 10 dB amplifier, and
Generic leaky feeder.

The parts list can be easily modified by a design engineer as new components are placed on the market, removed from the market or repriced. The ability to maintain a unique equipment list for each drawing enables the designer to carry out rapid design analyses to compare and contrast the performance and cost of different vendor components. The impact of utilizing a specific component in terms of both cost and wireless communication system performance can be seen immediately using the present invention. Information that can be tracked with the bill of materials includes the manufacturer and part number, physical and installation cost, RF loss characteristics, connections, and the frequencies for which the component is valid. In addition, a rich set of customization features is utilized to enable the designer to tailor the parts list library to suit the needs of the target application. Moreover, as components with associated length data, such as cables or leaky feeder antennas, are created, stretched, moved or modified, their associated costs and impact on wireless system performance are automatically updated in the bill of materials to account for the change in length. Furthermore, the parts list is stored as an integral part of the drawing database, allowing the user to recall and archive a system design and all of its particulars. In addition, the wireless communication system performance may be recalculated immediately, using either a standard link budget equation, noise figure equation, or some other metric such as bit error rate or network throughput. This recalculation uses the specific electrical specifications of each component in the system, which is also stored in the bill of materials.

Referring again to the drawings, and more particularly to FIG. 16, there is shown an example of a bill of materials summary for a drawing. A description of the base station "MACROCELL" 1610 is shown to identify the antenna system for which the summary is shown. The first component 1611 is a PCN Panel 1710-1990 92 Deg 9.00 dB Gain point antenna manufactured by Allen Telecom. One should note that the component cost 1612, sub-total cost 1613 and total system cost 1614 is $0.00. This shows that the designer has not yet updated the parts list library with current costs. When the list has been updated, the summary will automatically show component costs as well as sub-totals and totals for all base stations and components in the drawing.

FIG. 17 show a bill of materials where costs have been entered into the parts list database. Another component 1720 has been added to the "MACROCELL" base station, also. The costs of each component 1612a and 1721 are now shown. Sub-total 1613a and Total costs 1614a are also shown.

Figure 18:
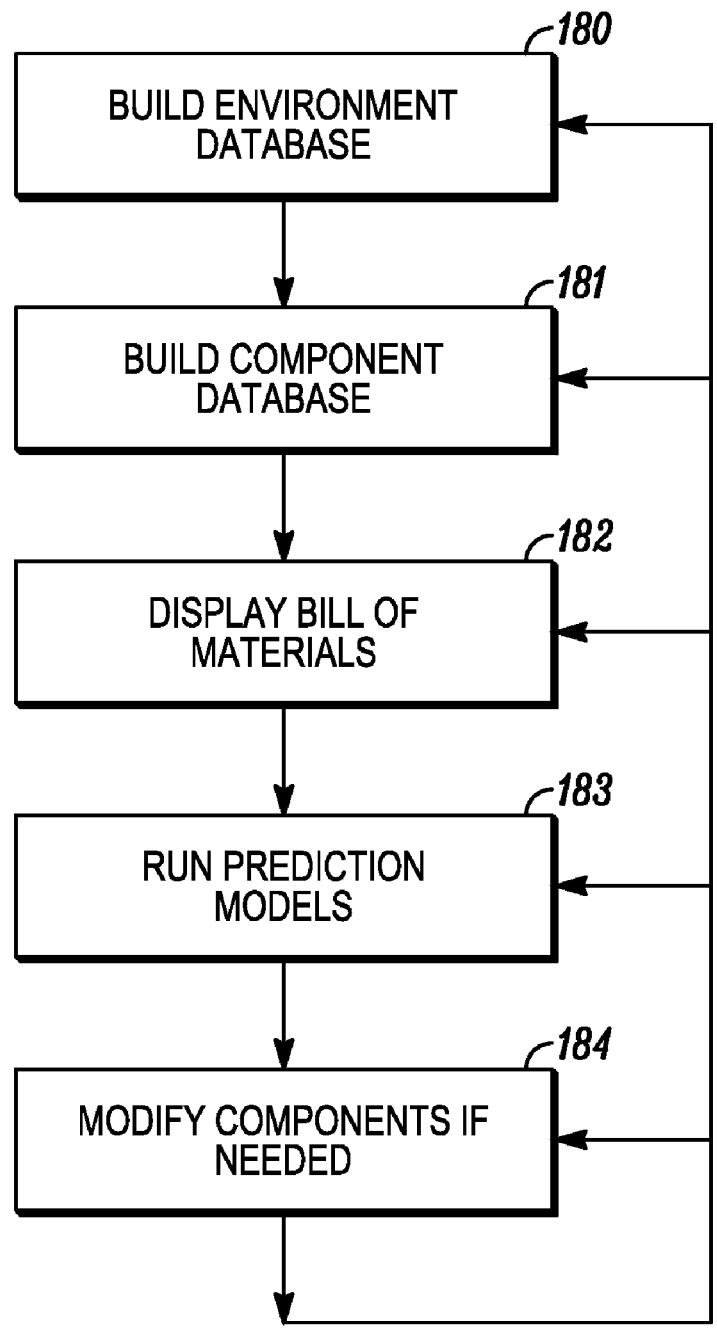
FIG. 18 is a flow diagram showing the general method of the present invention.

Referring now to FIG. 18, the general method of the invention is shown. As previously described, first the designer must create a database defining the desired environment in function block 180. A preferred method is disclosed in application Ser. No. 09/318,841, now U.S. Pat. No. 6,850,946. A database of components in then developed in function block 181. In the case of wireless communication networks, a preferred method is described above. The creation of these components will automatically generate a parts list categorized by base station and antenna system. A bill of materials may be displayed at any time in function block 182.

In order to optimize the design of the wireless communications system and ensure adequate antenna coverage, the designer runs a series of prediction models and optimization techniques in function block 183. A preferred method for running predictions is described above. This method allows the designer to see, in real-time, changes in coverage, generally, and for specifically chosen watch points, as antennas are repositioned or reoriented. The designer may choose to add, delete or substitute components in function block 184 and then re-run the models again in function block 183. Each time the designer makes a modification in the system to improve performance, the bill of materials is automatically updated. The designer may run the prediction models in function block 183, and determine if the wireless system, as designed, is adequate in terms of performance and cost. If not, the designer can choose to modify components using cost or component performance considerations. Performance parameters may be entered to enable the designer to choose substitute components from a list that contains only those components that would not degrade the performance of the overall system. Note that in the preferred embodiment, the prediction or system performance models are recomputed upon user demand, but that it would be apparent to one skilled in the art to also have models recomputed instantly ("on-the-fly") as new components are added or subtracted from the bill of materials.

The integration of the bill of materials and component performance specifications is key to providing a quick and efficient method to design high performance wireless communication networks that are within budget.

Figure 19:
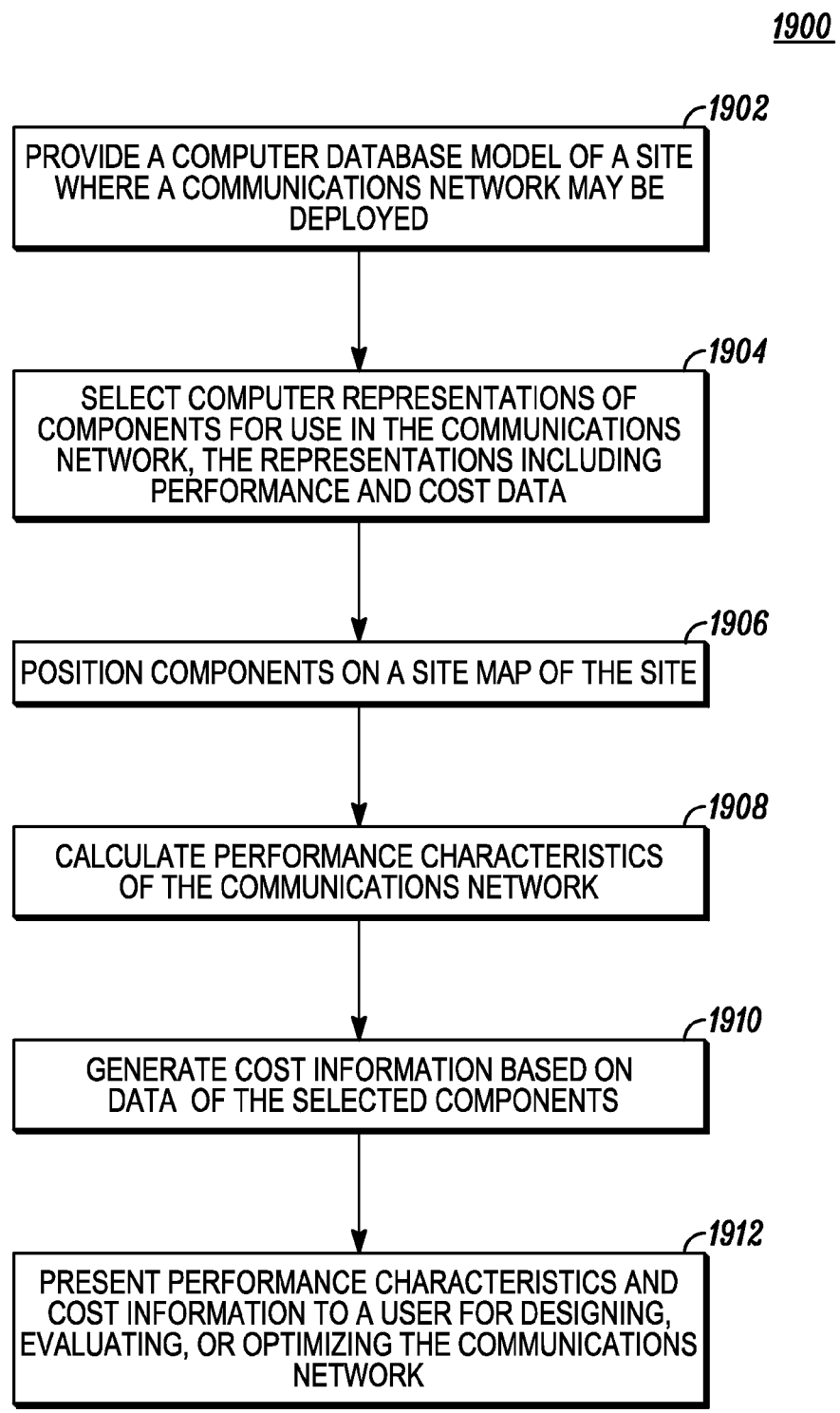
FIG. 19 is a flow diagram of a method for designing, evaluating, or optimizing a communications system.

FIG. 19 shows a method 1900 of a method for designing, evaluating, or optimizing a communications system in accordance with various embodiments of the invention. The method begins at 1902 by providing a computer database model of a site where a communications network may be deployed. Then at 1904, computer representations are selected of one or more components which may be used in the communications network from amongst a collection of computer representations of components. The computer representations of each of the one or more components include performance and cost data. The components are then positioned at 1906, on a site map of the site modeled with the computer database model. One or more performance characteristics of the communications network modeled with the computer database model are then calculated at 1908. Cost information is generated at 1910 based on cost data of the one or more components that were selected in the selecting step 1904. Finally, at 1912 the performance characteristics and cost information are presented to a user for designing, evaluating, or optimizing the communications network.

In accordance with various embodiments of method 1900, the site map of the site modeled by the computer database model at 1902 may be three dimensional. The site map may display at least a portion of at least one floor plan of at least one floor of at least one building.

In accordance with further embodiments of this method, the positioning step 1906 may position one or more components in three dimensions on the site map. The positioning step 1906 allows specifying an orientation of the one or more components at one or more locations on the site map.

In accordance with further embodiments of method 1900, the calculating step 1908 may include the step of activating on or more predictive models for calculating the performance characteristics.

In accordance with further embodiments of this method, the presenting step 1912 may comprise displaying the site map with the one or more components positioned on the site map. The step of displaying may display the cost information generated in the generating step.

In accordance with further embodiments of this method, the selecting step 1904 may include the steps of displaying a listing of the computer representations and pointing and clicking on one or more of the computer representations in the listing. The step of selecting 1904 may also operate in conjunction with a pull down menu. The step of selecting 1904 may include sorting the computer representations based on a range of acceptable performance criteria. The selecting step 1904 may also include sorting the computer representations based on a range of cost criteria. The positioning step 1906 may utilize a point-and-click feature for positioning the one or more components in the site map.

The method may further comprise changing a component selected during the selecting step 1904, changes resulting from the changing step being reflected in the performance characteristics calculated in said calculating step 1908 and the cost information generated in the generating step 1910. The method may further comprise the step of changing a component selected during said selecting step 1904, changes resulting from the changing step being reflected in said performance characteristics calculated in the calculating step 1908. The method may further comprise the step of changing a component selected during said selecting step 1904, changes resulting from the changing step being reflected in the cost information generated in the generating step 1910.

The method 1900 may further comprise the step of changing a position of a component within said site map from a previous position, changes resulting from the changing step being reflected in at least one of said performance characteristics calculated in the calculating step 1908 or said cost information generated in the generating step 1910. The method may further comprise the step of changing an orientation of a component within said site map from a previous orientation, changes resulting from the changing step being reflected in at least one or said performance characteristics calculated in the calculating step 1908 or said cost information generated in said generating step 1910.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A method for designing, evaluating, or optimizing a communications system, comprising the steps of:
    providing a computer with a computer database model of a site for deployment of a communications network;
    selecting computer representations from the computer of one or more components for use in said communications network from amongst a collection of computer representations of components, said computer representations of each of said one or more components including performance and cost data;
    positioning said one or more components on a site map of said site modeled with said computer database model at the computer;
    the computer performing the steps of:
    calculating one or more performance characteristics of said communications network modeled with said computer database model;
    generating cost information based on cost data of said one or more components selected in said selecting step; and
    presenting said one or more of performance characteristics and cost information to a user of the computer for designing, evaluating, or optimizing the communications network.

2. The method of claim 1 wherein said site map of said site modeled by said computer database model is three dimensional.

3. The method of claim 2 wherein said site map displays at least a portion of at least one floor plan of at least one floor of at least one building.

4. The method of claim 2 where in said positioning step positions said one or more components in three dimensions on said site map.

5. The method of claim 1 wherein said site map displays at least a portion of at least one floor plan of at least one floor of at least one building.

6. The method of claim 1 wherein said positioning step positions said one or more components in three dimensions on said site map.

7. The method of claim 1 wherein said positioning step allows specifying an orientation of one or more components at one or more locations on said site map.

8. The method of claim 1 wherein said presenting step comprises the step of displaying said site map with said one or more components positioned on said site map.

9. The method of claim 8 where said step of displaying displays cost information generated in said generating step.

10. The method of claim 1 wherein said selecting step includes the steps of displaying a listing of said computer representations and pointing and clicking on one or more of said computer representations in said listing.

11. The method of claim 10 wherein said selecting step operates in conjunction with pull down menu.

12. The method of claim 1 wherein said selecting step includes the step of sorting said computer representations based on a range of acceptable performance criteria.

13. The method of claim 1 wherein said selecting step includes the step of sorting said computer representations based on a range of cost criteria.

14. The method of claim 1 wherein said positioning step utilizes a point-and-click feature for positioning said one or more components in said site map.

15. The method of claim 1 further comprising the step of changing a component selected during said selecting step, changes resulting from said changing step being reflected in said performance characteristics calculated in said calculating step and said cost information generated in said generating step.

16. The method of claim 1 further comprising the step of changing a component selected during said selecting step, changes resulting from said changing step being reflected in said performance characteristics calculated in said calculating step.

17. The method of claim 1 further comprising the step of changing a component selected during said selecting step, changes resulting from said changing step being reflected in said cost information generated in said generating step.

18. The method of claim 1 further comprising the step of changing a position of a component within said site map from a previous position, changes resulting from said changing step being reflected in at least one of said performance characteristics calculated in said calculating step or said cost information generated in said generating step.

19. The method of claim 1 further comprising the step of changing an orientation of a component within said site map from a previous orientation, changes resulting from said changing step being reflected in at least one or said performance characteristics calculated in said calculating step or said cost information generated in said generating step.

20. The method of claim 1 wherein said calculating step includes the step of activating one or more predictive models for calculating said performance characteristics.

* * * * *

UNITED STATES PATENT AND TRADEMARK OFFICE
CERTIFICATE OF CORRECTION

PATENT NO. : 7,596,518 B2
APPLICATION NO. : 10/266711
DATED : September 29, 2009
INVENTOR(S) : Rappaport et al.

It is certified that error appears in the above-identified patent and that said Letters Patent is hereby corrected as shown below:

ON THE TITLE PAGE

1. On Page 2, in Field (56), under "OTHER PUBLICATIONS", in Column 2, Line 2, delete "Terrrain" and insert -- Terrain --, therefor.
(LIST OF REFERENCES CITED BY APPLICANT AND CONSIDERED BY EXAMINER DATED MARCH 20, 2008, SHEET 11 OF 15 (PAGE 177 OF FW), UNDER "OTHER DOCUMENTS", ENTRY 2, LINE 1)

2. On Page 2, in Field (56), under "OTHER PUBLICATIONS", in Column 2, Line 2, delete "Enviroments" and insert -- Environments --, therefor.
(LIST OF REFERENCES CITED BY APPLICANT AND CONSIDERED BY EXAMINER DATED MARCH 20, 2008, SHEET 11 OF 15 (PAGE 177 OF FW), UNDER "OTHER DOCUMENTS", ENTRY 2, LINE 2)

3. On Page 2, in Field (56), under "OTHER PUBLICATIONS", in Column 2, Line 24, delete "Marrow," and insert -- Morrow, --, therefor.
(LIST OF REFERENCES CITED BY APPLICANT AND CONSIDERED BY EXAMINER DATED MARCH 20, 2008, SHEET 12 OF 15 (PAGE 178 OF FW), UNDER "OTHER DOCUMENTS", ENTRY 6, LINE 1)

4. On Page 2, in Field (56), under "OTHER PUBLICATIONS", in Column 2, Line 24, delete "Reveiw" and insert -- Review --, therefor.
(LIST OF REFERENCES CITED BY APPLICANT AND CONSIDERED BY EXAMINER DATED MARCH 20, 2008, SHEET 12 OF 15 (PAGE 178 OF FW), UNDER "OTHER DOCUMENTS", ENTRY 6, LINE 1)

5. On Page 3, in Field (56), under "OTHER PUBLICATIONS", in Column 1, Line 1, delete "J.L." and insert -- H.L. --, therefor.
(LIST OF REFERENCES CITED BY APPLICANT AND CONSIDERED BY EXAMINER DATED Signed and Sealed this
Sixth Day of September, 2011

David J. Kappos
*Director of the United States Patent and Trademark Office*

MARCH 20, 2008, SHEET 12 OF 15 (PAGE 178 OF FW), UNDER "OTHER DOCUMENTS", ENTRY 9, LINE 1)

6. On Page 3, in Field (56), under "OTHER PUBLICATIONS", in Column 1, Line 1, delete "Accurracy" and insert -- Accuracy --, therefor.
(LIST OF REFERENCES CITED BY APPLICANT AND CONSIDERED BY EXAMINER DATED MARCH 20, 2008, SHEET 12 OF 15 (PAGE 178 OF FW), UNDER "OTHER DOCUMENTS", ENTRY 9, LINE 1)

7. On Page 3, in Field (56), under "OTHER PUBLICATIONS", in Column 1, Line 9, delete "MPGR" and insert -- MPRG --, therefor.
(LIST OF REFERENCES CITED BY APPLICANT AND CONSIDERED BY EXAMINER DATED MARCH 20, 2008, SHEET 12 OF 15 (PAGE 178 OF FW), UNDER "OTHER DOCUMENTS", ENTRY 11, LINE 2)

8. On Page 3, In Field (56), under "OTHER PUBLICATIONS", in Column 1, Line 17, delete "Rappapoprt," and insert -- Rappaport, --, therefor.
(LIST OF REFERENCES CITED BY APPLICANT AND CONSIDERED BY EXAMINER DATED MARCH 20, 2008, SHEET 13 OF 15 (PAGE 179 OF FW), UNDER "OTHER DOCUMENTS", ENTRY 2, LINE 1)

9. On Page 3, in Field (56), under "OTHER PUBLICATIONS", in Column 1, Line 43, delete "Shakkattai" and insert -- Shakkottai --, therefor.
(LIST OF REFERENCES CITED BY APPLICANT AND CONSIDERED BY EXAMINER DATED MARCH 20, 2008, SHEET 13 OF 15 (PAGE 179 OF FW), UNDER "OTHER DOCUMENTS", ENTRY 10, LINE 1)

10. On Page 3, in Field (56), under "OTHER PUBLICATIONS", in Column 1, Line 45, delete "Wireles" and insert -- Wireless --, therefor.
(LIST OF REFERENCES CITED BY APPLICANT AND CONSIDERED BY EXAMINER DATED MARCH 20, 2008, SHEET 13 OF 15 (PAGE 179 OF FW), UNDER "OTHER DOCUMENTS", ENTRY 10, LINE 2)

11. On Page 3, in Field (56), under "OTHER PUBLICATIONS", in Column 2, Line 19, delete "www.ericcson.com" and insert -- www.ericsson.com --, therefor.
(LIST OF REFERENCES CITED BY APPLICANT AND CONSIDERED BY EXAMINER DATED MARCH 20, 2008, SHEET 15 OF 15 (PAGE 181 OF FW), UNDER "OTHER DOCUMENTS", ENTRY 8, LINE 1)

12. On Page 3, in Field (56), under "OTHER PUBLICATIONS", in Column 2, Line 23, delete "Comapny" and insert -- Company --, therefor.
(LIST OF REFERENCES CITED BY APPLICANT AND CONSIDERED BY EXAMINER DATED MARCH 20, 2008, SHEET 15 OF 15 (PAGE 181 OF FW), UNDER "OTHER DOCUMENTS", ENTRY 10, LINE 1)

13. On Page 3, in Field (56), under "OTHER PUBLICATIONS", in Column 2, Line 29, delete "Jul." and insert -- Jun. --, therefor.
(LIST OF REFERENCES CITED BY APPLICANT AND CONSIDERED BY EXAMINER DATED MARCH 20, 2008, SHEET 1 OF 1 (PAGE 182 OF FW), UNDER "OTHER DOCUMENTS", ENTRY 1, LINE 1)

IN THE SPECIFICATION

14. In Column 19, Line 59, delete "in" (first occurrence) and insert -- is --, therefor.
(AMENDMENTS TO THE SPECIFICATION DATED SEPTEMBER 19, 2008, PAGE 5, LINE 15)

IN THE CLAIMS

15. In Column 22, Line 4, In Claim 4, delete "where in" and insert -- wherein --, therefor.
(AMENDMENTS TO THE CLAIMS DATED MAY 29, 2009, PAGE 2, CLAIM 150, LINE 1)

16. In Column 22, Line 25, in Claim 11, delete "with pull" and insert -- with a pull --, therefor.
(AMENDMENTS TO THE CLAIMS DATED MAY 29, 2009, PAGE 3, CLAIM 157, LINES 1-2)